(12) United States Patent
Qiao

(10) Patent No.: US 8,711,419 B2
(45) Date of Patent: Apr. 29, 2014

(54) PRESERVING USER APPLIED MARKINGS MADE TO A HARDCOPY ORIGINAL DOCUMENT

(75) Inventor: Mu Qiao, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 716 days.

(21) Appl. No.: 12/638,400

(22) Filed: Dec. 15, 2009

(65) Prior Publication Data

US 2011/0141521 A1 Jun. 16, 2011

(51) Int. Cl.
| | |
|---|---|
| G06K 15/00 | (2006.01) |
| G06K 15/02 | (2006.01) |
| G06K 9/34 | (2006.01) |
| G06K 9/46 | (2006.01) |
| H04N 1/40 | (2006.01) |
| H04N 1/387 | (2006.01) |
| H04N 1/38 | (2006.01) |
| H04N 1/409 | (2006.01) |

(52) U.S. Cl.
USPC ........ 358/1.18; 358/1.11; 358/1.16; 358/453; 358/462; 358/464; 382/173; 382/176; 382/190

(58) Field of Classification Search
USPC ............. 358/1.16, 1.18, 1.11, 3.26, 453, 462, 358/464; 382/173, 176, 190
See application file for complete search history.

(56) References Cited

U.S. PATENT DOCUMENTS

| | | | |
|---|---|---|---|
| 5,229,589 A | * | 7/1993 | Schneider ..................... 235/456 |
| 5,850,474 A | | 12/1998 | Fan et al. |
| 5,983,218 A | | 11/1999 | Syeda-Mahmood |
| 6,377,758 B1 | | 4/2002 | Ou Yang et al. |
| 6,397,213 B1 | | 5/2002 | Cullen et al. |
| 7,366,357 B2 | | 4/2008 | Curry et al. |

(Continued)

OTHER PUBLICATIONS

Brendan McCane, Edge Detection, Feb. 20, 2001, University of Otago, Dunedin, New Zealand.

(Continued)

*Primary Examiner* — Fred Guillermety
(74) *Attorney, Agent, or Firm* — Philip E. Blair; Fleit Gibbons Gutman Bongini & Bianco P.L.

(57) ABSTRACT

What is disclosed is a novel system and method for preserving user-applied markings made to a hardcopy of an original document and for generating a new composite document containing the user markings which can be reprinted without loss of image quality. In one embodiment, an original document is scanned to produce a digital representation thereof. One or more marked documents containing the user markups are scanned. The user markings are identified in each of the marked document by an iterative comparison between the marked document and the image of the original document. The identified user markings are stored to records. Thereafter, the stored user markings are retrieved and combined into an image of the original document to produce a new composite document containing selected user markings. The new file is smaller in file size and has no loss of image quality during subsequent reprints. Various embodiments have been disclosed.

26 Claims, 18 Drawing Sheets

(56) References Cited

U.S. PATENT DOCUMENTS

| | | | |
|---|---|---|---|
| 7,376,269 B2 | 5/2008 | Klassen et al. | |
| 8,196,030 B1* | 6/2012 | Wang et al. | 715/200 |
| 2002/0138476 A1* | 9/2002 | Suwa et al. | 707/3 |
| 2004/0163042 A1* | 8/2004 | Altman | 715/512 |
| 2006/0288278 A1 | 12/2006 | Kobayashi | |
| 2007/0092140 A1 | 4/2007 | Handley | |
| 2008/0016078 A1 | 1/2008 | Karlsson et al. | |
| 2008/0050016 A1 | 2/2008 | Kawano et al. | |
| 2008/0148067 A1* | 6/2008 | Sitrick et al. | 713/193 |
| 2008/0231909 A1 | 9/2008 | Nakamura et al. | |
| 2009/0265286 A1 | 10/2009 | Nagarajan | |
| 2011/0249299 A1* | 10/2011 | Wu et al. | 358/3.26 |

OTHER PUBLICATIONS

Barbara Zitova and Jan Flusser, Image Registration Methods: A Survey, Pod Vodarenskou Vezi, Nov. 9, 2001, Institute of Information Theory and Automation, Prague, Czech Republic.

Henry S. Baird and Michael A. Moll and Jean Nonnemaker and Matthew R. Casey and Don L. Delorenzo, Versatile Document Image Content Extraction, SPIE/IS&T Document Recognition & Retrieval XIII Conference, Jan. 2006, Lehigh University, Bethlehem, Pennsylvania.

Dashan Gao and Yizhou Wang and Haitham and Minh Do, Decompose Document Image Using Integer Linear Programming, ICDAR, Sep. 2007, University of Californiam Curitibia, Brazil.

* cited by examiner

PRESERVING USER APPLIED MARKINGS MADE TO A HARDCOPY ORIGINAL DOCUMENT

TECHNICAL FIELD

The present invention is directed to systems and methods for preserving user markings made to a hardcopy of an original document.

BACKGROUND

In many business and government environments, a document such as a Power Point presentation or a Microsoft® Word Document is printed by the document's creator and circulated throughout the office to various managers, co-workers, engineers, scientists, etc., for comments, suggestions, modifications, and the like. Each user's comments are often provided back to the document's author in the form of handwritten markings made to the face their copy of the circulated original. In many businesses, government offices, law firms, and the like, it may be desirable to preserve such user-applied markings. In order to preserve these markings, typically the individual marked copies from each respective user are scanned into electronic form and stored as entire separate files along with the original. While this may seem like a straight-forward way to preserve this kind of information, in large office environments wherein many users regularly apply comments to their respective copies, storing scanned versions of each entire document to preserve such user-applied markings necessarily creates separate copies of the original document. This consumes more electronic storage space than is needed to preserve each respective user markings. Moreover, in many office environments, users such CEO's, CFO's, and senior management, want to review a document which has already been circulated which contains the various user-applied markings from their staff in a final composite document. Methods to selectively apply user markings to produce such a final composite document are also needed.

Accordingly, what is needed in this art are systems and methods for preserving user-applied markings made to a hardcopy print of an original document.

INCORPORATED REFERENCES

The following U.S. Patents, U.S. Patent Applications, and Publications are incorporated herein in their entirety by reference.

"Method And System For Analyzing Imaging Problems", U.S. Pat. No. 6,377,758.

"Systems And Methods For Detecting Image Quality Defects", U.S. Pat. No. 7,376,269.

Image Processing Apparatus, Image Processing Method, Computer Readable Medium, And Computer Data Signal', U.S. patent application Ser. No. 11/783,396, filed: Apr. 9, 2007.

"System And Method Of Billing For Printing Service Costs By Examining The Content Of A Page", U.S. patent application Ser. No. 11/873,113, filed: Oct. 16, 2007.

"Customized System And Method Of Billing For Printing Service Costs By Examining The Contents Of Printed Pages", U.S. patent application Ser. No. 12/106,036, filed: Apr. 18, 2008.

"*A Mutual Information Based Automatic Registration and Analysis Algorithm for Defect Identification in Printed Documents*", Chandu, K.; Saber, E.; Wencheng Wu; IEEE Int'l Conf. on Image Proc., Vol. 3, pp 449-452, (Sep. 16, 2007-Oct. 19, 2007).

"*Image Registration Methods: A Survey*", Barbara Zitova and Jan Flusser, Image and Vision Computing Vol. 21 pp. 977-1000 (2003).

"*Edge Detection*", Brendan McCane, COSC453-Vision, (Feb. 20, 2001).

"*Numerical Methods for Image Registration*", Jan Modersitzki (Author), Oxford University Press, $1^{st}$ Ed. (March 2004), ISBN-13: 978-0198528418.

"*2-D and 3-D Image Registration: For Medical, Remote Sensing, and Industrial Applications*", A. Ardeshir Goshtasby (Author), Wiley Interscience; $1^{st}$ Ed. (March 2005), ISBN-13: 978-0471649540.

BRIEF SUMMARY

What is disclosed is a novel system and method for extracting and preserving user markings made to a hardcopy of an original document.

In one example embodiment, the present system and method involves the following. An image of the original document is received. The image of the original can be obtained directly from the document author in electronic form or obtained from a scan of a hardcopy print using an image input device such as a document scanner. Various users have made their user markings to copies of the hardcopy original document to produce respective marked documents. The marked documents are converted to images of each respective marked document using a document scanner. By comparison between each of the marked documents against the image of the original document, user markings made to each marked documents are identified. The identified user markings are extracted and preserved. Related information about the original document, such as title, author, and the like, is associated with the preserved user markings. Also preserved with each extracted user marking is information which effectuates a reapplication of the extracted user marking back onto its respective page such as, for example, page number, location within a page, and the like. In various embodiments, information about the extracted user markings is obtained via a graphical user interface. Individual user markings can be edited or deleted in their entirety. At time of print, the extracted and preserved individual user markings are combined back into the image of the original document to generate a new composite document containing one or more user markings. Various alternative embodiments, features, and enhancements have been disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
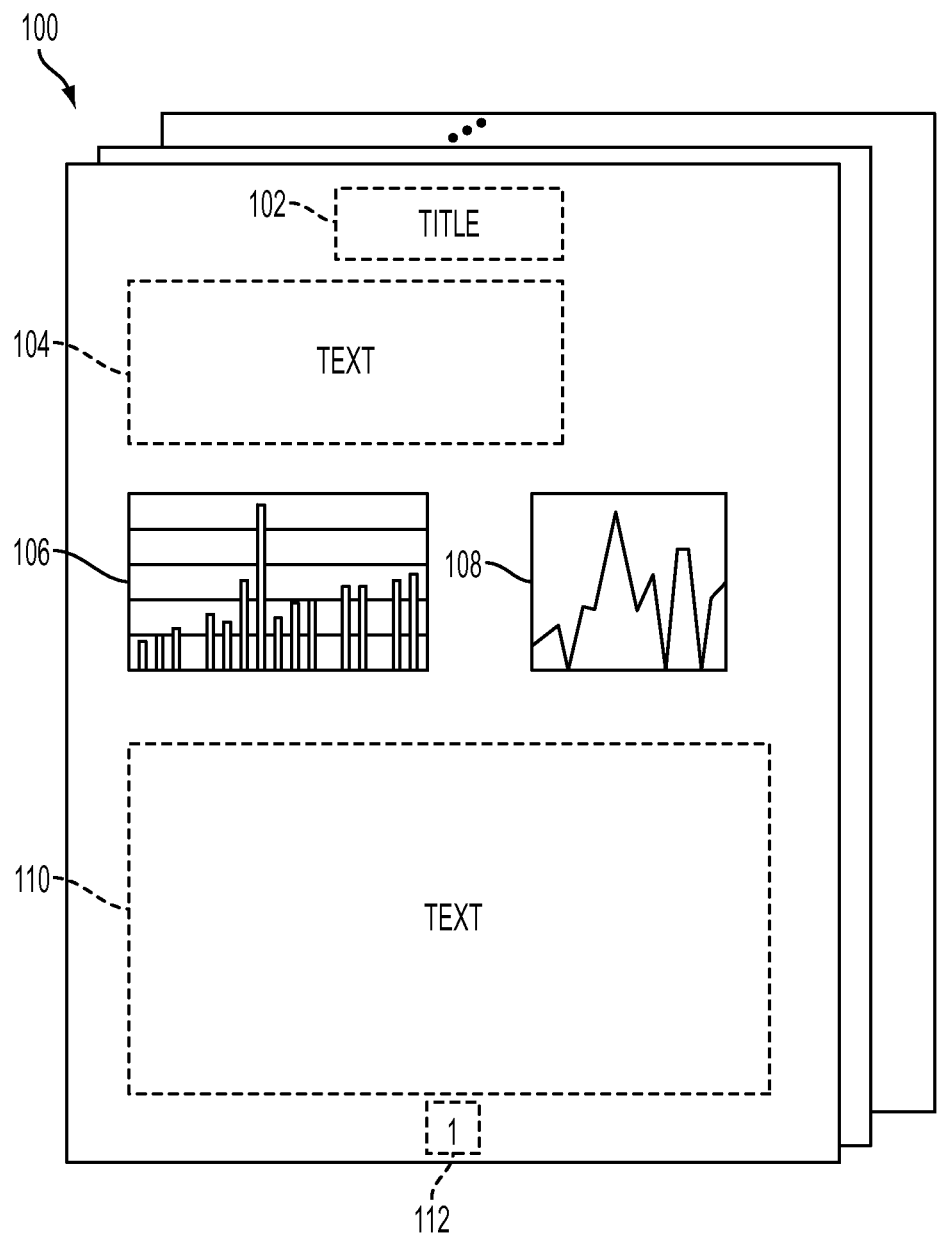
FIG. 1 shows an example plurality of original documents wherein various content objects have been embedded.

What is disclosed is a system and method for preserving user markings which have been applied to a hardcopy print of an original document and for generating a new composite document containing the extracted user markings.

It should be understood that one of ordinary skill in this art would be readily familiar with many facets of identifying and extracting document content objects from an image of a document.

Non-Limiting Definitions

A "pixel", as used herein, refers to the smallest segment into which a document image can be divided. Received pixels of a document image are associated with a value defined in terms of, for example, a color space, color, intensity, lightness, brightness, or a mathematical transformation thereof. Pixel values may be converted to a chrominance-luminance space using, for instance, a RBG-to-YCbCr converter to obtain luminance (Y) and chrominance (Cb, Cr) values. It should be appreciated that pixels may be represented by values other than RGB or YCbCr.

A "document object", or "embedded object" is separable content contained within a document. Various file formats, such as those employed by Microsoft® Office and Adobe® Acrobat, enable documents to act as containers. Example objects include text, graphics, pictures, plots, user markings, line art, or any combination or sub-combination thereof. Objects can be generally classified as follows: contone objects, text, line art, graphic, low frequency halftone objects, high frequency halftone objects, and solid fill objects. A monochrome contone object is an object or image comprising pixels having a range of shades corresponding to a single color, such as black toner (or ink). Color contone objects are objects comprising pixels having a range of shades corresponding to more than one color. In a CMYK color system, a color contone object or image may contain cyan and magenta toner (or ink). Monochrome text objects are text (e.g., alphanumeric characters in English or any other textual or character based representations) printed with pixels in a single color, usually black. Color text objects are text whose pixels are determined to use more than one color, such as green. Monochrome line art objects are line objects that are printed in a single color. Color line art objects are line objects printed using more than one color. Monochrome graphic objects are objects having a larger number of pixels of a single color arranged to form at least one edge defining a geometric shape. Color graphic objects have a large number of pixels in more than one color arranged to form at least one edge defining a geometric shape. The frequency of the pixels in an image determines if an object is "low frequency" or "high frequency." A monochrome low frequency halftone object is an object having a smaller number of pixels of halftone image data in a single color. A monochrome high frequency halftone object has a larger number of pixels of halftone image data in a single color. Color low frequency halftone objects have a smaller number of pixels of halftone image data in more than one color. Color high frequency halftone objects have a larger number of pixels of halftone image data in more than one color. An example color high frequency halftone object is color photograph. Solid fill objects are objects comprising a smaller number of pixels arranged to form a plurality of connected edges. Monochrome solid fill objects have a smaller number of pixels forming a plurality of connected edges in a single color. Color solid fill objects have a smaller number of pixels forming a plurality of connected edges in more than one color. A solid fill object may be an area with the same color throughout such as a solid color block, for example.

"Extracting an object" refers to isolating an embedded object sufficient to effectuate an identification and removal of that object from it's respective source document.

An "original document" is to a version of a document to which a user marking will be applied. An original document can be, for instance, a Word document, a Power Point presentation, an album of photos, a legal document such as a will, lease, contract, and the like, or a purchase order, invoice, or other documents common to various streams of commerce. An original document may or may not contain embedded objects. An example first page of an original document containing a plurality of embedded objects is shown and discussed with respect to FIGS. 1 and 3.

A "marked document" is an original document to which a user marking has been applied. An example marked document is shown and discussed with respect to FIGS. 2 and 4.

A "hardcopy of an original document" is an original document which has been reduced to a print using, for example, an image output device such as a color printer.

Figure 12:
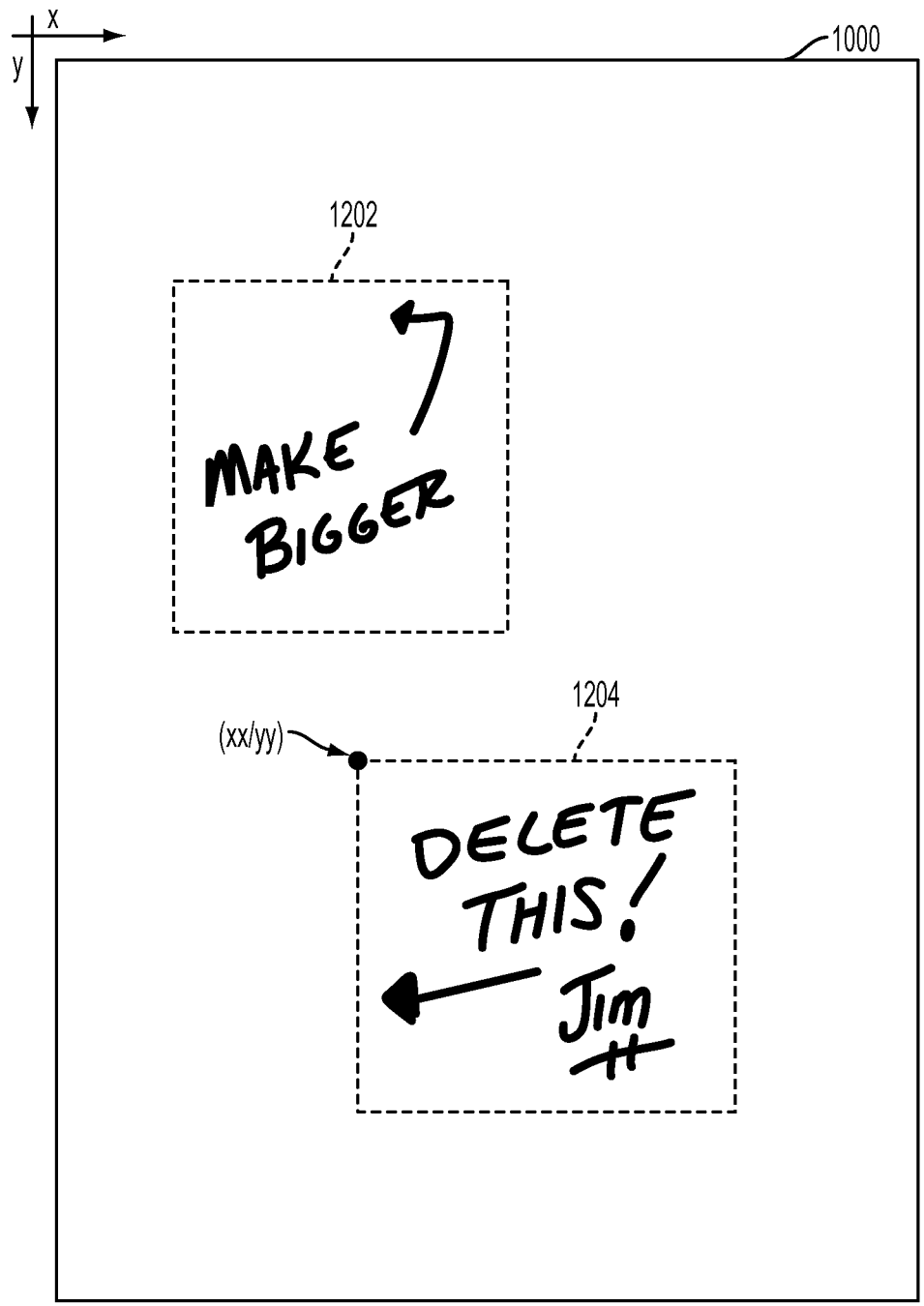
FIG. 12 show the example bitmap image of FIG. 10 wherein two identified user markings 1202 and 1204 with example rubber-band boxes having been draw around each by a user.

A "user marking" or "user-applied marking" refers to a marking made by a user to a hardcopy of an original document. Such markings may take the form of comments, notes, equations, symbols, figures, drawings, signatures, and the like. A user marking can be a handwritten marking made onto the original document or may be added to the original document by, for instance, taping an image to the original document, or stamping the original document with a rubber stamp having been wetted with ink. Example user markings in a bitmap of a single page are shown in FIG. 12 wherein each user marking is encompassed by a rubber-band box made by a user.

"Information about an original document" refers to any attribute which helps identify the original document such as, for example, title, author, date, and the like. Such information may also be attribute which identifies the original document file to a document editing software or a computer file system such as, for example, file time/date, file name, file size, file type such as PDF, WORD, TEXT, PPT, and the like, file folder, file location, and the like used to identify the original document. Any information, whether user-entered or obtained from an operating system, file system, or software program, which can be used to associate an extracted user marking with it's respective original document is intended to fall within this definition.

An "image of a document" or "document image" refers to an electronic version of a document (original or marked). An image of a document can be obtained by document designing software such as Microsoft® Word, Power Point, Adobe® PhotoShop, and the like. An electronic version, or digital presentation of a hardcopy print of a document, can also be obtained using, for example, a document scanner. Various embodiments of document image generating software or scanning devices generate a bitmap of a document image which corresponds bit-for-bit with the original image, and which is generally in a same format used in the display's video memory, or maybe in a device-independent bitmap. The bitmap is characterized by the width and height (X and Y dimensions) of the image in pixels and by the number of bits-per-pixel which defines a color depth, i.e., the number of colors a given pixel can represent. Generation of a document image is shown and discussed with respect to the functional overview of FIG. 5 and the example networked workstation of FIG. 15.

"Document decomposition" is a process of identifying and extracting embedded objects from a document image. Various document decomposition software tools recursively process document images. Such tools typically treat extracted objects as children of a parent document. Embedded objects may also have their own embedded objects thereby recursively supporting an infinite number of parent-child relationships.

"Image registration" is the process wherein two or more images of documents are overlaid, usually in a memory, to geometrically align the two images. Image registration spatially transforms an image of a second document such that it substantially aligns with an image of a first document. Image registration methods are widely used in pattern recognition, artificial vision systems, and the medical image processing arts.

An "image input device" is a device capable of producing an image document. The set of image input devices is intended to encompass scanners, cameras, photography equipment, facsimile machines, and digital document reproduction devices. One example image input device that optically scans a document and converts the document into an image of the document is shown and discussed with respect to the scanning device 512 of FIG. 5 and document scanner 604 of FIG. 6. Common examples are variations of the flatbed scanner, widely known in the arts, wherein specialized receptors move beneath a clear platen and scan the face of the document placed on the platen. A digital signal of the scanned document is generated which, in various embodiments, contains information about pixels such as color value, intensity, location, and the like, which collectively provide a digital representation of the document scanned. Such devices may be in communication with computer systems and workstations, memory and storage devices, networked platforms such as servers and client devices, and other devices.

An "image output device" is any device capable of rendering an image of a document. The set of image output devices includes digital document reproduction equipment and other xerographic systems, photographic production and reproduction equipment, including a wide variety of marking devices as are known in the arts. One example image output device is shown and discussed with respect to the color marking device 504 of FIG. 5 and image output device 618 of FIG. 6. An inkjet printer is one example color marking device which renders an image from a received signal of the document image by the visual integration of color inks deposited onto a media. The term "rendering" is intended to be broadly interpreted. In one respect, rendering means reducing a signal of the document image to a viewable form. Rendering is also intended to mean storing the document image to a storage device, or to a repository of documents.

"Storage Device" refers to a device or system capable of storing documents or images. One embodiment of a storage device is a database, as are well known in the arts, placed in communication with a computer system, workstation, and/or server, that is either remote from or collocated with a device hosting a computing process that accesses and/or stores documents or images of document. Storage devices include RAM, ROM, Cache Memory, CD-ROM, DVD, flash drives, hard drives, and other volatile or non-volatile storage media.

Figure 18:
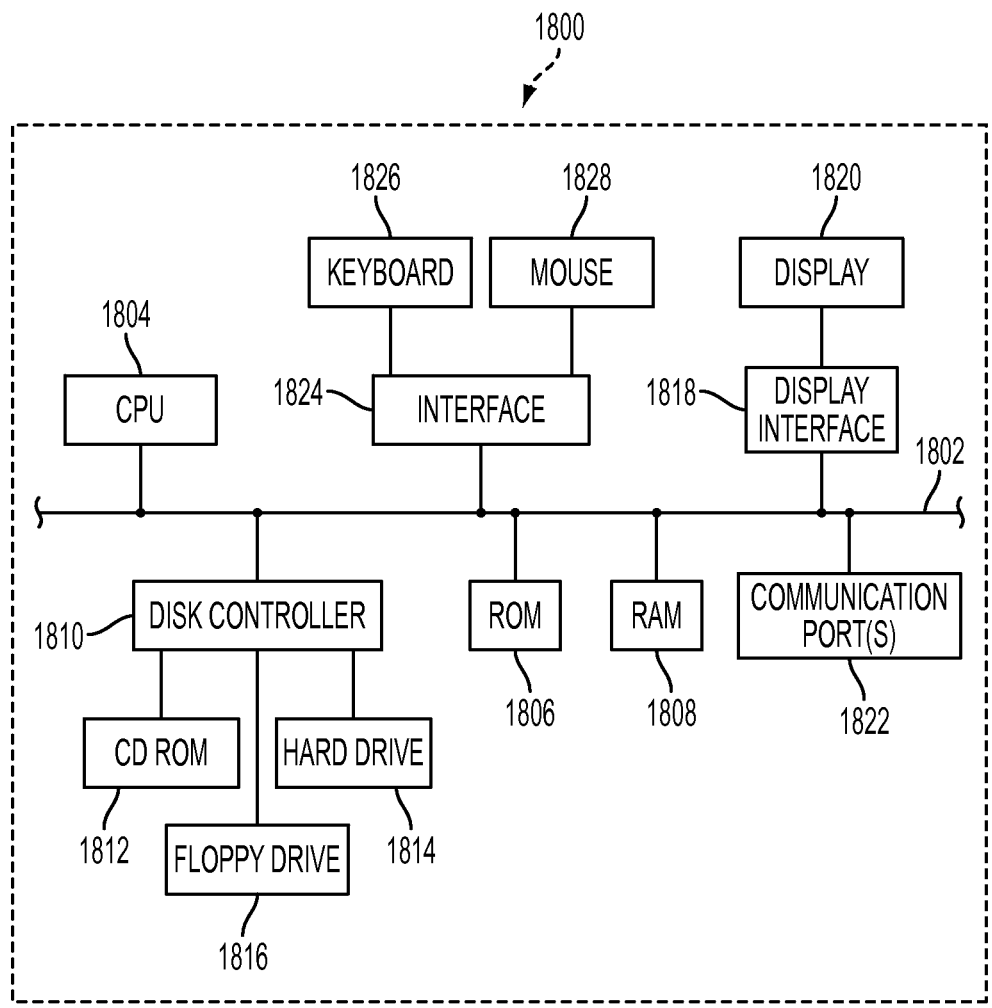
FIG. 18 illustrates a block diagram of one example embodiment of a special purpose computer system for implementing one or more aspects of the systems hereof as further described with respect to the various flow diagrams hereof.

A "module" designates a system component comprised of software or hardware, or a combination of both which is designed to perform a given function. A plurality of modules may collectively perform a given function. A module may be implemented using a single software program comprising, at least in part, machine readable program instruction, or a single piece of hardware such as an ASIC, electronic circuit, or special purpose processing system such as is shown in FIG. 18. A plurality of modules may be executed by either a single computer system or a plurality of computer systems operating in parallel. Connections between modules (or "units") include both physical and logical connections.

The term "system", as used herein, includes one or more software and/or hardware modules which may further comprise an operating system, drivers, device controllers, and other apparatuses some or all of which may be connected via a network.

Example Documents

Figure 2:
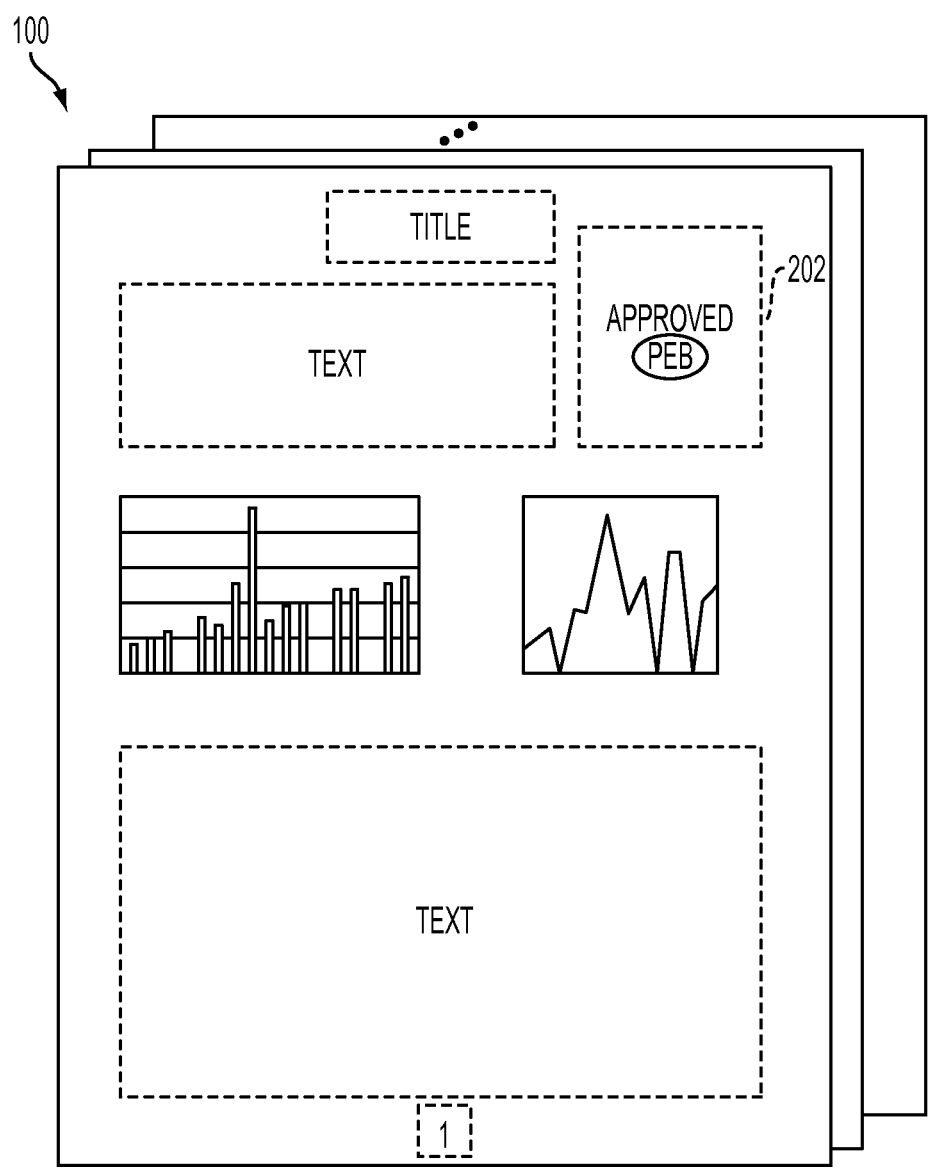
FIG. 2 shows the original documents of FIG. 1 whereon a user marking (at 202) has been applied to the upper right-hand corner of a first page.

Reference is now being made to the illustration of FIG. 1 which shows an example plurality of original documents 100 wherein various content objects have been embedded. The plurality of documents 100 of FIG. 1 are intended to represent example pages of an original multi-page document wherein various document content objects have been embedded. The dashed lines surrounding certain of the objects of the first page of the plurality of documents are for illustration purposes and are not intended to represent content. The embedded objects shown on the first page of the example original document are a title block 102, a first section of text 104, a first graphic 106, a second graphic 108, a second section of text 110, and a page number 112. Each of the remaining pages of the example plurality of documents 100 have their own respective embedded objects. FIG. 2 which shows an example first page of the marked document of FIG. 1 whereon a user has applied user marking 202 in the upper right corner of the page. The consumer of this document, for example, a manager or president of a company, has reviewed this document and wrote the word "APPROVED" with the initials "PEB" on the first page. The dashed lines surrounding the user marking 202 is for illustration purposes and does not represent consumer content.

Figure 3:
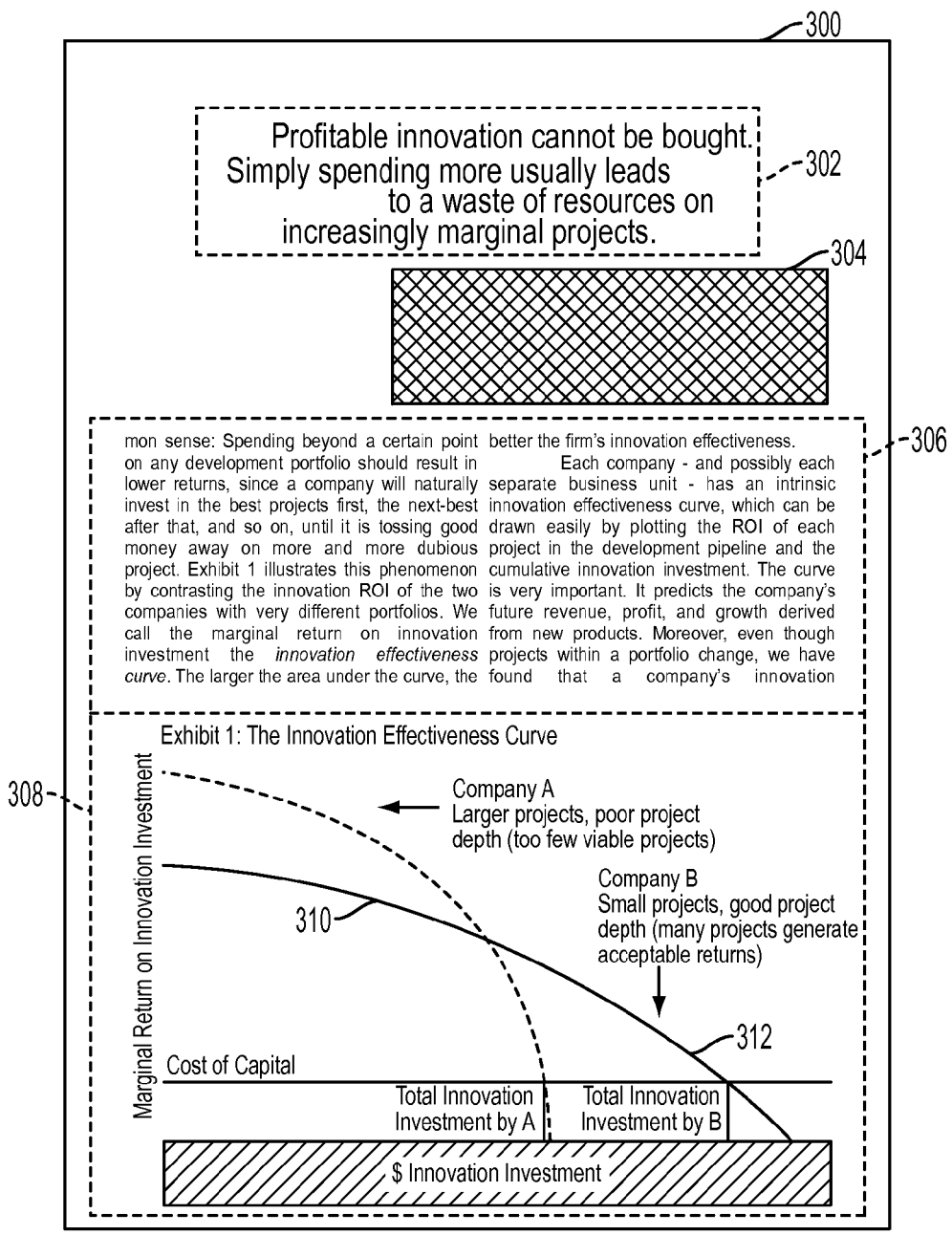
FIG. 3 shows yet another example original document with various content objects embedded therein.
Figure 4:
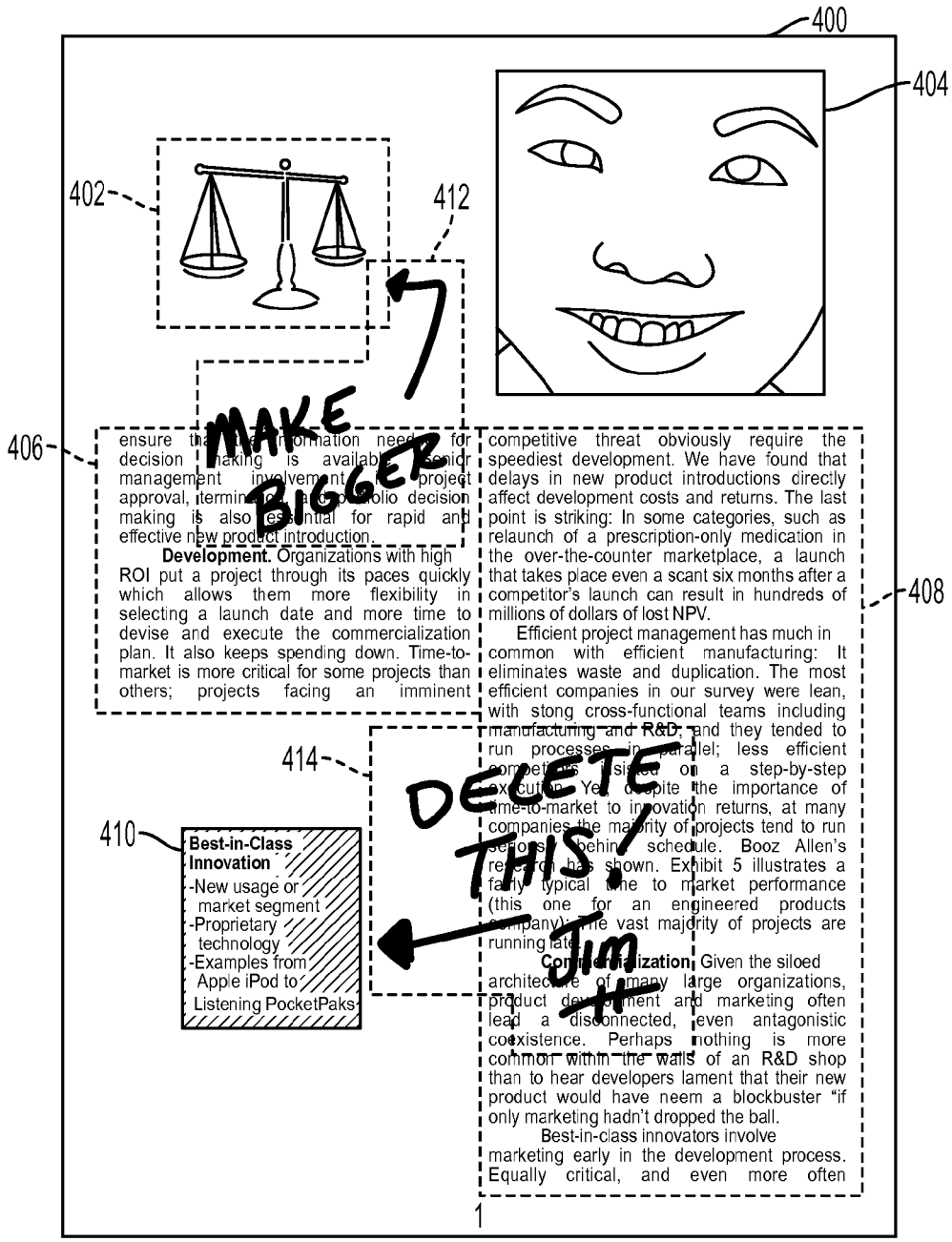
FIG. 4 shows yet another example marked document containing a first user marking (at 412) and a second user marking (at 414) having been applied.

Reference is now made to FIGS. 3 and 4 which illustrate examples of original documents with various object types contained therein. Page 300 includes text object 302, solid fill object 304, text object 306, graphic object 308 which has embedded therein color line art objects 310 and 312. Page 400 includes graphic object 402, high frequency halftone object 404, text objects 406 and 408, line object 410 which embeds low frequency halftone object 412. Also shown in FIG. 4 are two user markings. A first handwritten user marking at 412, shown encompassed by a dashed line, is an example user-applied comment that the art object 402 be made bigger. A second handwritten user marking at 414, also shown encompassed by a dashed line, recommends that the author delete the line object 410, for some reason. The user who applied this particular marking to the hardcopy of the circulated original document also wrote the name "JIM" as part of user marking 414. The first and second user markings (412 and 414 of FIG. 4) may not have been applied by the same user. For example, one manager may have made first user marking 412 and another manager may have made second user marking 414. It should be appreciated that the user markings, although shown in black/white, can be color markings having been applied by, for example, using a color marker or a color pen or pencil. These may further comprise pictures or graphics, for instance, which have been taped or otherwise fixed to the original document. Such fixed user markings may be, for instance, pictures, photos, charts, graphs, and the like, may further include additional user markings such as text, for example.

Example Document Marking Process

Figure 5:
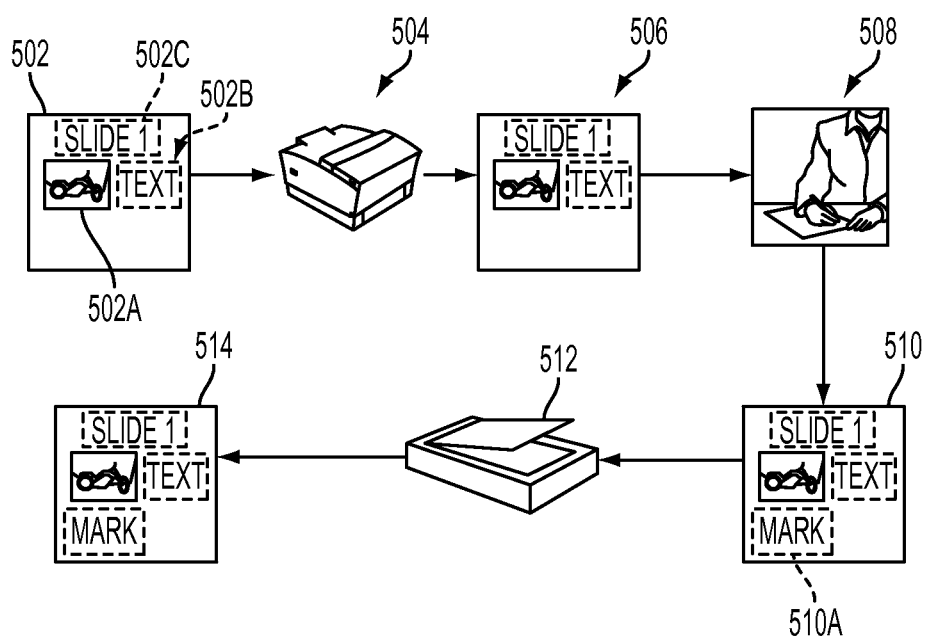
FIG. 5 is a block diagram providing a functional overview of an example process of generating a marked document.

Reference is now being made to the block diagram of FIG. 5 providing a functional overview of the generation of a marked document by a user applying a marking to the surface of a hardcopy print example electronic document 502.

In FIG. 5, an electronic version of original document 502 (titled "SLIDE 1") has a plurality of embedded object content shown as photo object 502A, text object 502B, and title object 502C. The original document is created by a user using document creation software as are widely available in various streams of commerce. When printed using color marking device 504, a hardcopy 506 of original document 502 is created. A user applies a marking, shown generally at 508, to the surface of hardcopy original document 506 using, for instance, a marking pen. This produces marked document 510 with user marking 510A shown as the word "MARK". The word "MARK" is intended to represent a user-applied comment, for example. The marked 510 is scanned using document scanning device 512 to produce the image of marked document 514.

Example Networked System

Figure 6:
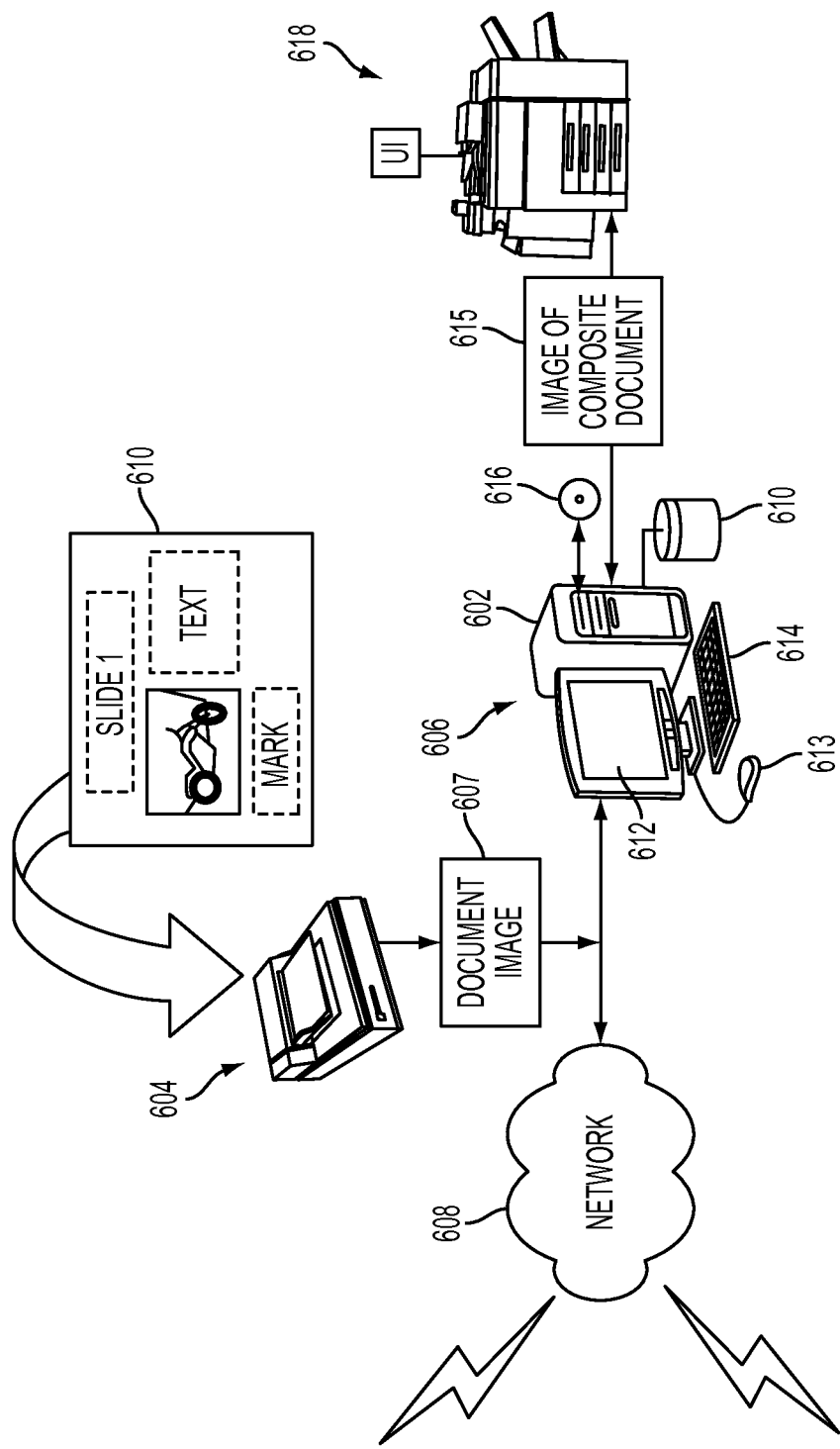
FIG. 6 illustrates one embodiment of an example networked system for performing the methods hereof described.
Figure 7:
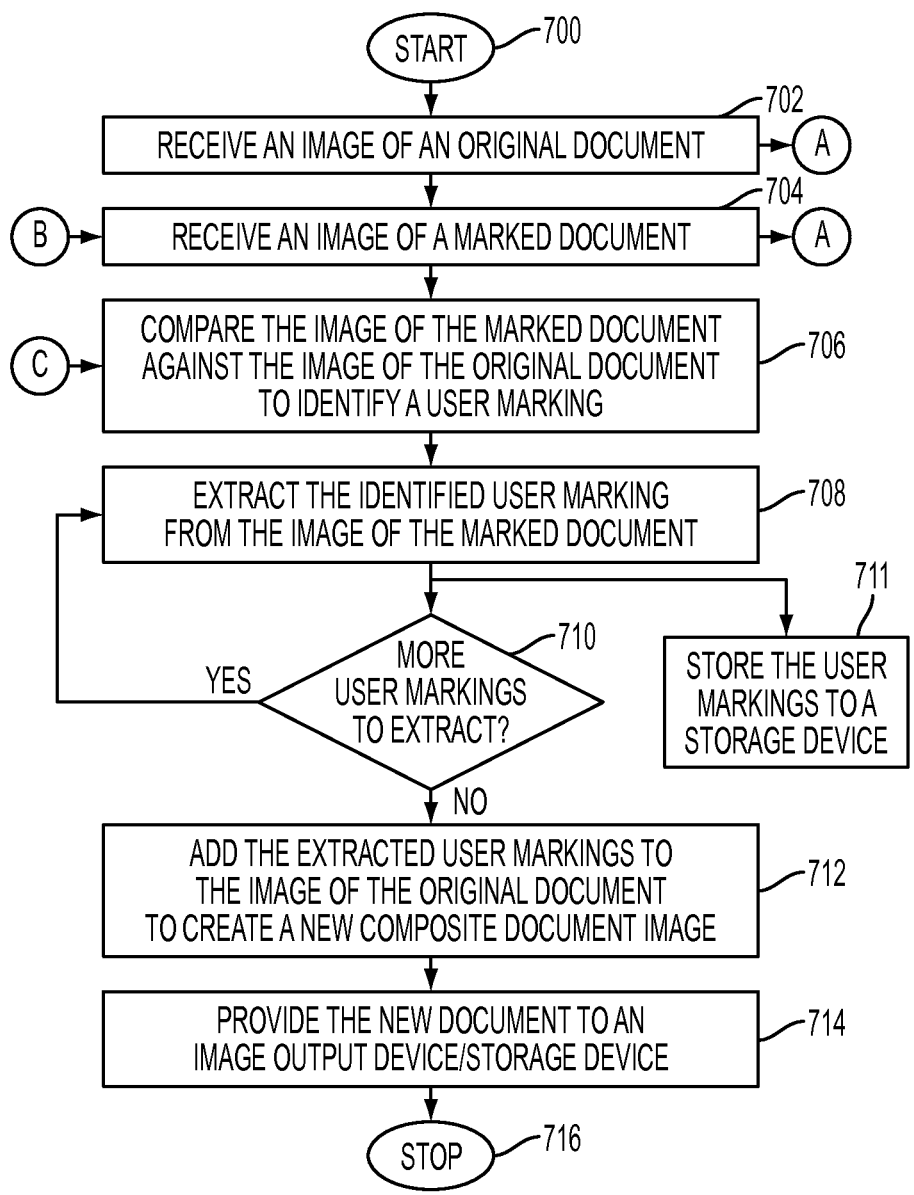
FIG. 7 illustrates one example embodiment of the present method for identifying and extracting user markings from an image of a marked document and for combining the extracted user markings into the image of the original document to generate a new composite document containing one or more of the extracted user markings.
Figure 8:
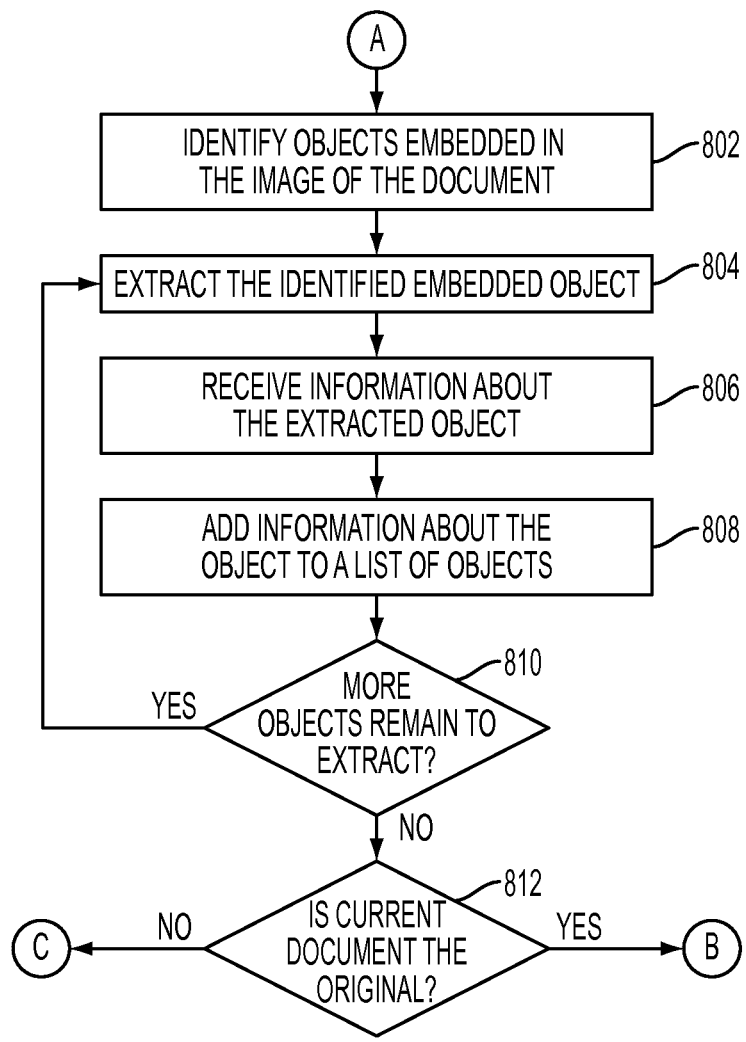
FIG. 8 is a continuation of the flow diagram of FIG. 7 with flow processing continuing with respect to node A to describe an embodiment wherein objects embedded in any of the original document image or the marked document image are extracted and stored.

Reference is now being made to FIG. 6 which illustrates one embodiment of an example networked system for performing the methods hereof described with respect to the flow diagrams of FIGS. 7 and 8. The document generation system converts a hardcopy marked document into an image of the marked document and provides that document image to a networked computer system in communication with an image output device.

As shown in FIG. 6, a hardcopy of the original document 506 is placed on the platen of image input device 604 and scanned to generate document image 607. In this instance, document image 607 is the image of the original document. In a similar manner, a hardcopy of marked document 510 is placed on the platen of image input device 604 and scanned to produce document image 607. In this instance, document image 607 is the image of the marked document. The process is repeated for each of the marked documents having user markings applied thereto. Any of document image 607 may be provided to computer system 606 in the form of signals received from a remote device placed in communication with computer system 606 via network 608. Further, any of document image 607 can be retrieved from memory or received from a remote device (not shown) via network 608. Computer system 606 may alternatively retrieve document image 607 (marked or original) from storage device 610. Storage device 610 may also store various extracted objects, user markings, object identifiers, file attributes, and the like, as part of records of objects such as those illustrated in FIG. 13. Computer system 606 is configured to perform any of the various aspects of the present method described with respect to the flow diagrams of FIGS. 7 and 8, and the embodiment of FIG. 14. Computer system 606 includes a hard drive (internal to computer housing 602) which reads/writes to a machine readable media such as a floppy disk, optical disk, CD-ROM, DVC, magnetic tape, etc. Computer case 602 generally houses a motherboard with a processor and memory, a communications link such as a network card, video graphics card, and other software and hardware to perform the functionality of a computer system.

The computer system includes a graphical user interface which, in various embodiments, comprises display device 612 such as a CRT, LCD, touchscreen, and the like, mouse 613, keyboard 614, and removable storage media device 616. It should be appreciated that the computer workstation 606 has an operating system and other specialized software configured to display a wide variety of numeric values, text, scroll bars, dials, slideable bars, pull-down menus, selectable options, buttons, and the like, for entering, selecting, modifying, accepting any of the displayed information. The embodiment shown is only illustrative and may include any other functionality which any display device known in the arts is capable of displaying. The display device merely illustrates one example embodiment. Software to configure a user interface or any portion thereof to display/enter/accept data is highly customizable and may be device dependent. Such software is usually considered proprietary. Therefore, a further discussion regarding specific programming techniques and software algorithms to program or otherwise configure a display device to display a certain set of settings is omitted herein. One of ordinary skill would program their display portions for a specific system in a particular print/copy job environment.

Extracted embedded objects, the extracted user markings, and any identification information about the extracted objects, original or marked documents or the user markings, can be processed, in accordance herewith, and stored using storage device 610. Any of the stored objects, files, and information may be communicated to another device via network 608 such as the Internet. Many aspects of the network, illustrated as an amorphous cloud, are known. As such, a detailed discussion as to the operation of the network or the configuration thereof has been omitted. Suffice it to say, data packets are transmitted by a network of special purpose servers connected via a plurality of communication links. Data is transferred in the form of signals which may be, for example, electrical, electronic, electro-magnetic, optical, or other signals. These signals are transmitted by wire, cable, fiber optic, phone line, cellular link, RF, satellite, or any other medium or communications link known in the arts. One computing device with access to the network communicates with another device with access to the network using well established network communication protocols.

The computer system is capable of communicating with any number of computer systems, device, and document reproduction systems similarly connected to network 608. Identification information about any of the extracted user markings and information about the original or marked documents or about any of the extracted embedded objects can be entered by a user using the graphical user interface shown with computer system 606. File attributes about the original document can be obtained from the operating system of the computer system using standard software protocols. Any of the extracted user markings, objects, or any of the file identification information can be retrieved from storage device 610 and applied to the image of the original document to produce new composite marked document 615 containing the extracted user marking which can be stored, communicated over network 608, or rendered to a hardcopy print using image output device 618.

Although shown as a generic desktop computer, it should be appreciated that the computer workstation 606 can be any of a laptop, mainframe, client/server, or a special purpose computer such as an ASIC, circuit board, dedicated processor, or the like. Computer system 606 may comprise any of the embodiments described with respect to the special purpose system of FIG. 18.

Flow Diagram of Example Object Extraction

Reference is now being made to the flow diagram of FIG. 7 which illustrates one example embodiment of the present method for identifying and extracting user markings from an image of a marked document and for combining the extracted user markings into the image of the original document to generate a new composite document containing one or more of the extracted user markings. Flow processing starts at start node 700 and immediately proceeds to step 702.

At step 702, receive an image of an original document. The received original document may be the original document shown by way of example document image 506 of FIG. 5, which has been received using image input device 512 of FIG. 5. The image of the original document may be received over network 608 from a remote device. In one embodiment, the original document is unmarked, i.e., no user markings have yet been applied. The original document may comprise the new composite document generated hereby which, in turn, was reduced to a hardcopy print by an image output device, and which has further user markings applied thereto in a second-round of commenting on the circulated new composite document by various users. As will be discussed further herein with respect to the flow diagram of FIG. 8, alternative embodiments include extracting embedded objects from the image of the original document and saving the extracted objects to storage device 610 of FIG. 6. In FIG. 8, flow processing proceeds with respect to node A and returns with respect to node B of FIG. 7.

At step 704, receive an image of a marked document containing at least one user marking. The hardcopy marked document is shown by way of example marked document 400 of FIG. 4 or by way of the example marked document 510 of FIG. 5. The hardcopy marked document is converted to an image of the hardcopy document using an image input device such as document scanner 512 of FIG. 5. The image of the marked document can be received over network 608 of FIG. 6 or may be received from a remote device. The marked document comprises the original document with a user marking having been applied to the face of a hardcopy print of the original document. As will be discussed further herein with respect to the flow diagram of FIG. 8, alternative embodiments include extracting the identified embedded objects from the image of the marked document and storing the extracted objects to a storage device.

Figure 10:
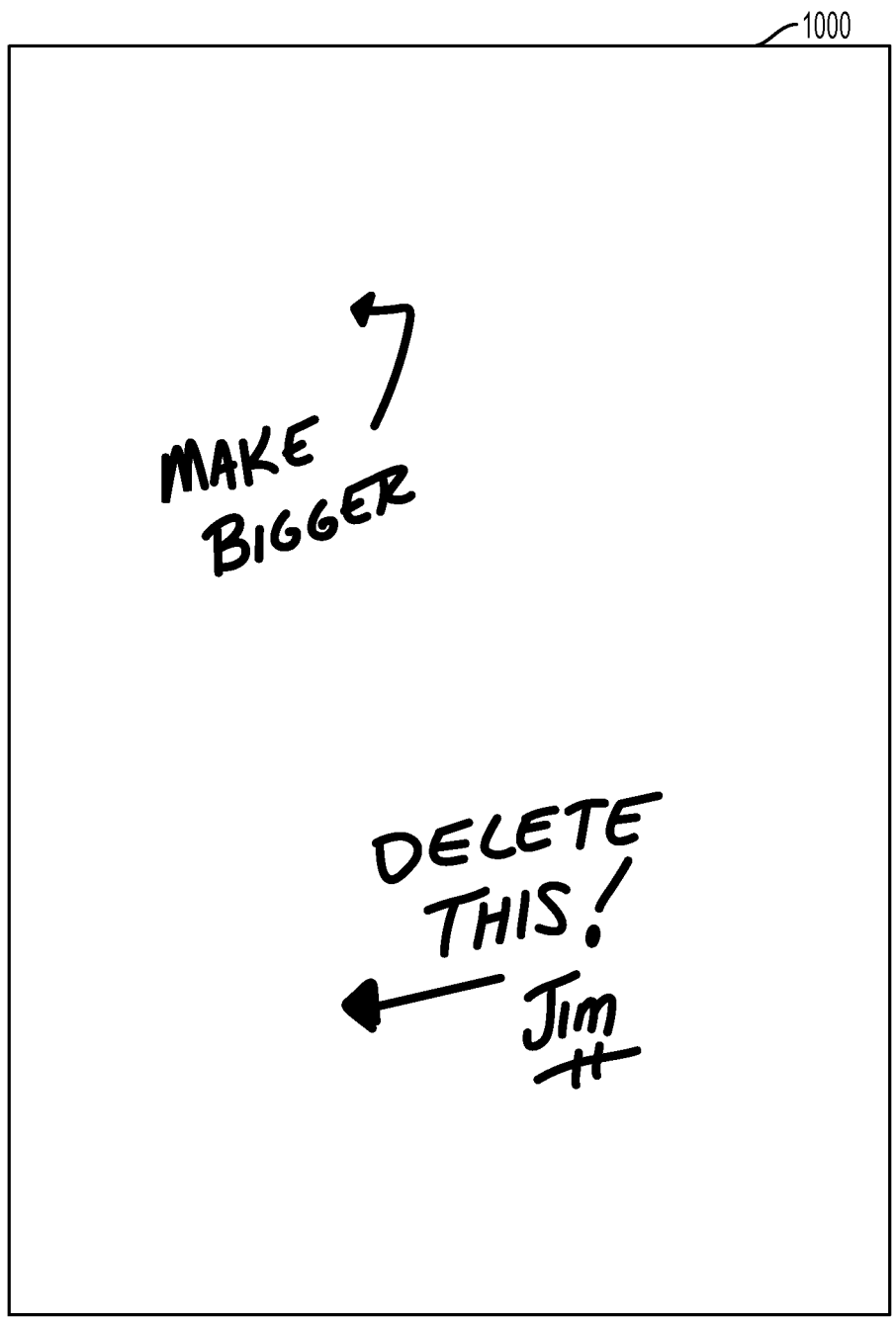
FIG. 10 shows an example bitmap of pixels in the image of marked document of FIG. 4 wherein user markings 412 and 414 have been identified.

At step 706, compare the image of the marked document against the image of the original document to identify a user marking in the image of the marked document. In various embodiments, image registration is first performed on the image of the original document and the image of the marked document to effectuate an alignment therebetween. As discussed above, image registration aligns two or more images such that the aligned images have a common geometric orientation. Such a process can be performed in the example computer system 606 of FIG. 6 by overlaying a bitmap of each received image. Once the two bitmaps are aligned, pixels of each bitmap can be digitally compared, either singularly on a row/column basis or in clusters, using for example a comparison method wherein pixel values in the bitmap are logically compared. As a result of this comparison, pixels determined to be exactly the same at a same location in both images producer a NULL pixel value at this location. Null pixels won't be printed. Such pixel locations are determined to be pixels which are common to both the image of the original document and the image of the marked document and thus do not comprise a user marking. More sophisticated pixel comparison methods determine that pixels at a same location in both images which are substantially similar, as determined by a pre-defined threshold, are determined to be pixels common to both images and thus do not comprise a user marking. Pixels found at a location in the image of the marked document which, at a same pixel location in the image of the original document, are determined to not be the same (or not substantially similar) are identified and retained. An example bitmap (or mask) created by the identification of pixels in the image of the marked document which were different than pixels at a same location in the image of the original document is shown in FIG. 10 wherein pixels of user markings 412 and 414 of FIG. 4 have been identified in pixel bitmap 1000 of FIG. 10. Upon completion of the pixel-by-pixel comparison of the two images, a bitmap is assembled using the retained information about identified pixels which are determined to be different. The bitmap created contains the identified user markings. The bitmap can be provided to a display, such as display 1103 of FIG. 11, wherein a user can crop the individual user markings from bitmap image 1000 of FIG. 10 using, for example, an image manipulation software tool as are common in commerce. The cropped user markings, at 1202 and 1204 of FIG. 12, of bitmap image 1000 can be stored to a record, such as any of those shown and discussed with respect to the embodiment of FIG. 13. Bitmap image 1000 of FIG. 10 can be stored to a storage device, either in whole or in part, along with information retained about the user markings such as, for example, pixel X/Y location in the bitmap image, pixel color values, and the like, is also stored.

Figure 9:
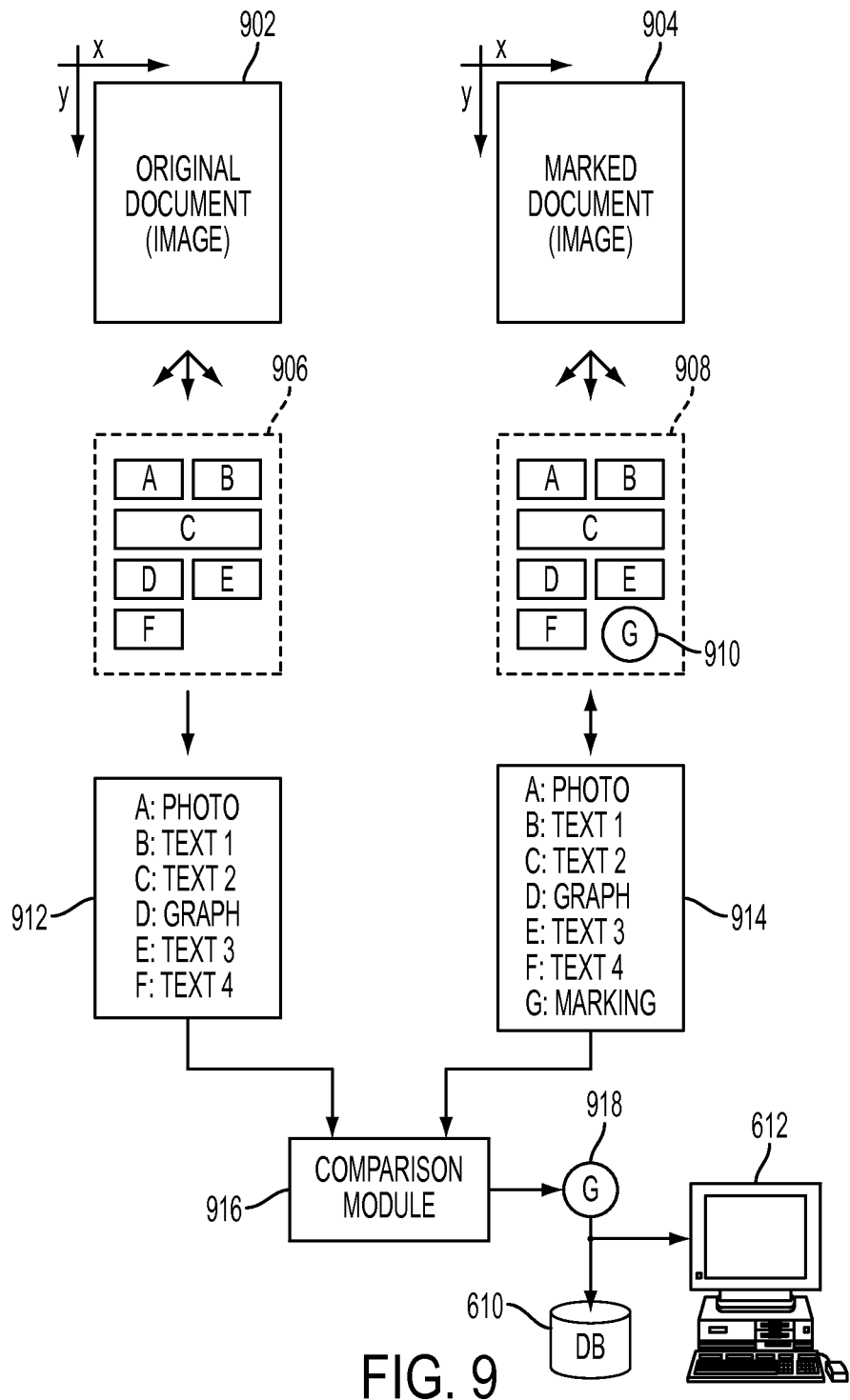
FIG. 9 shows an embodiment wherein an image of an original document and an image of a marked document are geometrically aligned to a common X/Y orientation and separable objects embedded, such as the embedded objects of the documents of FIGS. 1 and 2, contained therein are identified and a list of objects is created for each document image for object comparison purposes as described in various embodiments of the flow diagrams hereof.

In another embodiment, the user markings in the image of the marked document are identified using document decomposition wherein embedded objects are identified in the image of the original document and embedded objects in the image of the marked document. The embedded objects may be extracted and stored or displayed on a display device. The objects identified in each of the document images are then compared. Objects which have been identified from the marked document which have not been identified in the original document are determined to be user markings. In yet another embodiment, a list of objects is created from embedded objects identified in the image of the original document. Embedded objects are identified in the image of the marked document and a list of objects in the marked document is created. The two lists of identified objects are compared. If an object identified in the marked document is on the list of original objects, then that object is not a user marking. Likewise, if an object is identified in the marked document which is not on the list of known original objects then that object is considered to be a user marking which was applied to the original document. Such an embodiment is shown in FIG. 9 wherein an image of an original document 902 and an image of a marked document 904 are geometrically aligned to a common orientation, shown as X/Y axis. Such an original document having identifiable separable objects embedded therein is shown in FIG. 1. A marked document having identifiable separable objects embedded therein is shown in FIG. 2. Embedded objects in the image of the original document 902 (each labeled A, B, C, D, E, and F) are identified 906 and can be further extracted and stored. Likewise, objects embedded in the image of the marked document 904 (each labeled A, B, C, D, E, F, and G) are identified 908 and can be further extracted and stored. Note that, in this example, embedded object "G" is the separate user marking 910 (shown at 202 of FIG. 2) which was applied to the hardcopy of the original document to create the marked document. A first list 912 of embedded objects which have been identified in the image of the original document 902 is created. In the example, object "A" is identified as a photo object because this object was a determined to comprise, for example, a JPEG image. Objects "B" and "C" were identified as being text objects because these two objects comprised primarily alphanumeric characters which, in turn, can be further processed by a character recognition software. Object "D" was identified a line art object by any of its shape, form, composition, texture, or type, and objects "E" and "F" were identified as text objects. In this embodiment, a second list 914 is created from the objects identified at 908 in the image of the marked document 904. Since the marked document is a hardcopy of the original document having the user marking applied thereto, there will be substantial overlap between the identified objects. Thus, created list 914 comprises the same list of objects which were identified (at 906) in the image of the original document including object "G" which was also identified in the marked document. A comparison module 916 would then compare the objects in each of the lists to determine which objects were identified in the marked document which were not found in the list of objects identified in the image of the original document. Such a comparison module can reside as a hardware or software system within, for example, a computer system such as the example desktop computer 606 of FIG. 6. A comparison of the two lists shows that one object, labeled "G", was found in the image of the marked document which was not on the list of embedded objects in the image of the original document. Comparison module 916 provides the user marking (object "G") as an output. Such an output can be provided to storage device 610 or to display device 612 for a user identification.

Figure 11:
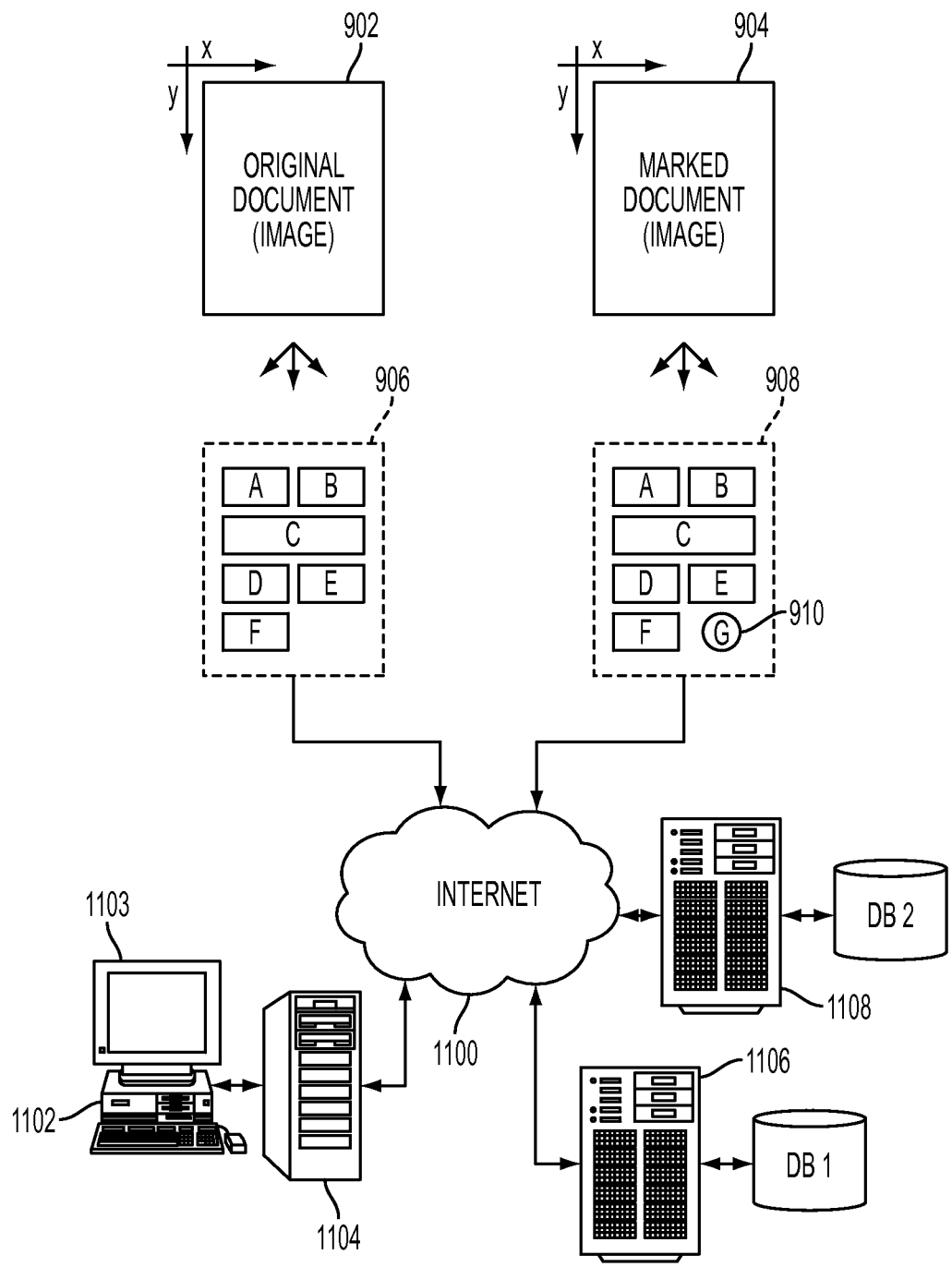
FIG. 11 illustrates an alternative embodiment to the embodiment of FIG. 9 wherein embedded objects identified in each of the image of the original document 906 and the image of the marked document 908 are communicated to system 102 over network 1100.

In another embodiment, any of the embedded objects identified in each of the image of the original document and the image of the marked document are extracted from their respective documents and provided to network 1100 of FIG. 11. Any of the identified objects, in whole or in part, along with any information associated with each user marking such that the extracted user markings (such as the markings cropped from image 1100 as shown in FIG. 12) can be communicated, stored, retrieved, and re-inserted back into an image of the original document at their original locations in the image. In the embodiment of FIG. 11, any of the identified objects and identified user markings is communication over network 1100 to server 1104 and provided to computer workstation 1102. Computer workstation 1102 displays any of the identified objects and any of the identified user markings on display device 1103, such as a monitor. The user, using the example graphical user interface associated with computer 1102, can provide identification information for each of the objects and user markings. In various embodiments, the user resizes, i.e., enlarges or reduces, any of the cropped user markings using image manipulation software tools having been pre-loaded onto computer 1102. Such user-provided identification information along with any of the user markings and objects (extracted or otherwise) can, in turn, be communicated over internet 1100 to example mainframe computers 1106 and 1108 for processing and stored in database DB-1 and DB-2, respectively.

With further reference again being made to the flow diagram of FIG. 7, at step 708, extract the identified user marking from the image of the marked document. Extraction of the identified user marking can be performed using well established document content object extraction techniques. Photos and graphs, for instance, can readily be extracted from an image of a document using edge detection methods. Text or blocks of text can be extracted from a region in a document using methods well known in the character recognition arts. The user marking can be extracted in a format which can be easily managed such as, for instance, text, JPEG, GIF, and the like. The extracted user marking can be further provided to a character recognition software which, depending on the legibility of the handwriting comprising the user marking, will convert the handwritten notes into alphanumeric characters. The extracted user marking can be stored, shown at step 711, as a record in a database of a storage device such as storage device 610 of FIG. 9. The extracted user marking can be communicated to a computer system and displayed on a graphical display device. The user can provide information and other comments about the extracted user marking which, in turn, will be stored with the user marking. Such information added by a user to a user marking may take the form of an identifying text string such as, for instance, "Jim's comment", or "(Steve 11-02-09)", or "From Engineering", or any information, textual or otherwise, which identifies one extracted user marking from another.

At step 710, a determination is made whether any more identified user markings need to be extracted. If so, then processing proceeds to step 708 wherein a next identified user marking is extracted from the marked document. Processing repeats until there are no more identified user markings to extract from the image of the marked document.

At step 712, add the extracted user marking into the image of the original document. Adding the extracted user marking into the image of the original document creates what is referred to herein as "a new composite document" image.

At step 714, provide the new composite document image to an image output device wherein the new document image is rendered. In various embodiments, the new composite document image is saved to a storage device. The new composite document image may be provided to a display device for a user review. The new composite document image may be communicated over a network, such as internet 1100 of FIG. 11, and provided to any of server 1104, or mainframe computers 1106 and 1108 and stored. Thereafter, further processing stops at 716.

Reference is now being made to the flow diagram of FIG. 8 which illustrates an embodiment hereof wherein objects identified in any of the image of the original document or the image of the marked document are extracted and stored. Flow processing proceeds with respect to node A.

At step 802, identify objects embedded in the received document image, either the image of the original documents received at step 702 of FIG. 7, or the image of the marked document received at step 704 of FIG. 7. Any of the document images can be received from the example computer system 606 via network 608. At step 804, the identified embedded object is extracted. Embedded objects are extracted using any of the image registration and document decomposition processes described with respect to the flow diagram of FIG. 7 and the various embodiments thereunder. The extracted objects may further be communicated to a computer system over a network and displayed on a display device for a user review.

At step 806, receive information about the extracted object. Such object identification information may include simple text strings such as "TEXT1", "PHOTO", "TEXT2", "GRAPH", and the like, as shown in the example list 912. In one embodiment, the extracted objects are displayed on a display device and object identification information is provided by a user using a graphical user interface. Such object identification information can be retrieved, in part, from the bitmap image itself such as pixel location in the bitmap wherein this object was found, pixel offsets from a reference location in the X/Y grid of the bitmap image, pixel color values, and the like. Object identification information is associated with the extracted object and stored with the object in a database of records of various objects identified and extracted from this particular document.

At step 808, add the object identification information to a list of objects. Such a list is shown and discussed with respect to list 912 and list 914 of FIG. 9. Such a list may include all the information known about a given object content or may simply include all or a portion of the object identification information and not include the object itself.

At step 810, a determination is made whether any more objects remain to be extracted in the document image currently being processed. If so, then processing repeats with respect to step 804 wherein a next identified object is extracted from the document image. Processing repeats for all objects in the document image. If, at step 810, there are no more objects to extract from the document image, then a determination is made whether the current document image being processed is the image of the original document. This step is performed such that the proper return node (B) or (C) of FIG. 8 can be identified. If the current document image is the image of the original document then flow processing proceeds with respect to node B of FIG. 7. Otherwise, the current document image being processed is the image of the marked document and flow processing proceeds with respect to node C of FIG. 7. Further processing thereof proceeds with respect to the example embodiment of FIG. 7, as discussed above. In such a manner, images of each of the original document and one or more images of marked documents are received. The received images are compared such that the user markings in each of the marked documents can be identified. The identified user markings are extracted and identification information associated therewith.

Various other embedded objects found within the image of the original document can also be identified and extracted. Identification information can also be associated with the extracted embedded objects and stored in a record. The extracted user markings can be selectively applied back into the image of the original document by a user using a graphical user interface and a new composite document created thereby. An example record of an object containing example identification information for any of an extracted object or an extracted user marking will next be discussed.

Example Record of Object Information

Figure 13:
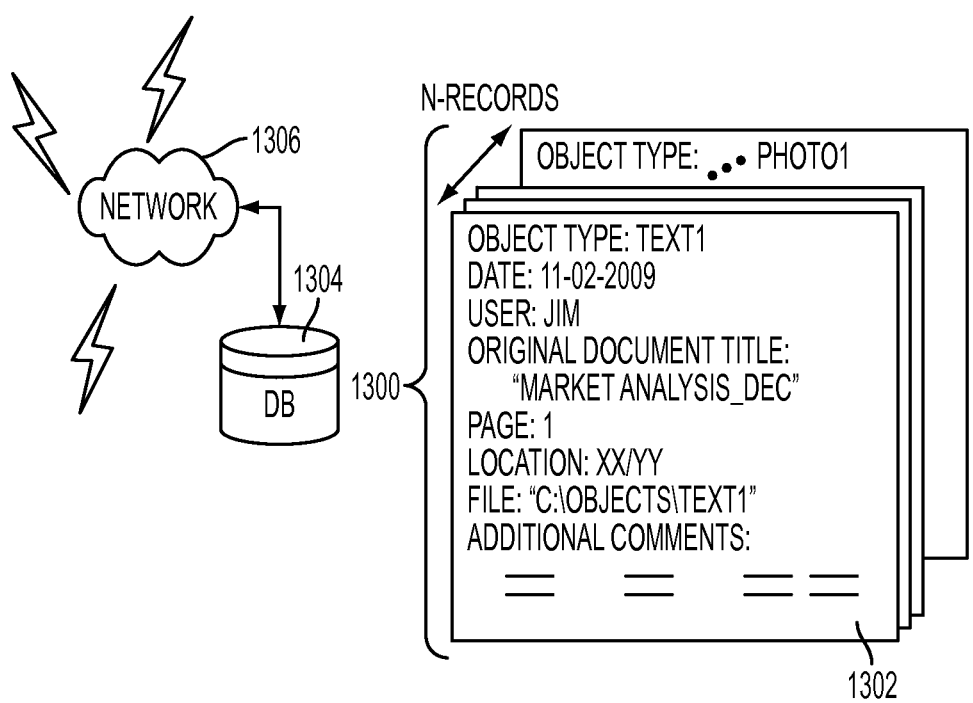
FIG. 13 illustrates a plurality of example records containing example identification information of user markings and/or objects extracted in accordance with the embodiments of the flow diagrams hereof.

Reference is now being made to FIG. 13 which illustrates a plurality of records containing identification information of any of a user marking or an extracted embedded object in accordance with the embodiments of the flow diagrams of FIGS. 7 and 8.

In FIG. 13, shown are a plurality of records, collectively at 1300, wherein a first record 1302 contains identification information having been entered by a user such as for example, user marking 1204 cropped from bitmap 1000 in a manner in accordance with the embodiment shown and discussed with respect to the flow diagrams hereof. It should be appreciated that the identification information, or any other information, contained in any of the example collection of records 1300 may be automatically generated and thus not requiring a user input. The example collection of records 1300 are stored in database 1304 which, in turn, is connected to network 1306. The network is intended to represent a communication connection with any of the computing devices of FIGS. 6 and 11. Database 1304 is capable of storing and retrieving records in response to a query. The database is also capable of adding new records, updating existing records, and providing retrieved records to a display device. Since database construction, query optimization, indexing methods, and record storage and retrieval techniques and algorithms are well known in the arts, a further discussion as to a specific database implementation is omitted. One of ordinary skill would be able to obtain a database from various vendors in commerce and place that database in communication with any of the illustrated computing devices. It should be appreciated that the database provided herewith for the storing and retrieval of records of objects and extracted user markings can be associated with any networked device. Whichever networked device the database is associated with on internet, it should be understood that information can be sent to any device connected to network. The illustrated database records are but one configuration.

Example object identification record 1302 is shown comprising a plurality of data fields which enable an extracted user marking to be associated with a particular location within a given page of a document from which it was extracted. For example, first record 1302 has an "Object Type" field. In this embodiment, the user marking is a text object (which can be further provided to a character recognition software). There is a "Date" field which can be any of, for example, the date the user marking was extracted, or the date that the user marking was applied to the hardcopy of the original document, or the date the original document was created. A timestamp field (not shown) can further be associated with a date field. Such time/date information can readily be extracted from the computing system used to extract the user marking in accordance with the teachings hereof. The 'User' field, in record 1302, shows that a user named "Jim" provided this particular extracted user marking being referred to by this particular record. There is also a "Original Document Title" field which, as it's name implies, refers to the title of the original document to which this particular marking is associated. A "Page" field refers to the number of the page in the original document which the associated user marking was applied. In this record, the extracted user marking (at 1204 of FIG. 12) associated with this record was retrieved from a first page of the original document of FIG. 4.

Also shown is a "Location" field. In this embodiment, the location field stores the coordinate location in the X/Y grid of bitmap 1000 wherein the upper left hand corner of object 1204 is positioned. Using the "Location" field information, this particular user marking can be placed back into the first page of an image of the original document at a same or substantially similar location from which it was extracted. Coordinate values shown as xx/yy, are illustrative and are intended to represent actual coordinate values which enable the placement of the extracted user marking (or extracted object) into the same page of the original document image from which it was extracted. The example record further has a "File" field which, in this embodiment, provides a location in a computer file system wherein the extracted user marking or object can be retrieved. In other embodiments, the extracted user marking or object is actually placed in the record in an easily manipulated format such as a JPG or TEXT, depending on the type of object it is. Sufficient information be provided with each identification record such that the associated user marking or object can be placed back into the original document from which it was extracted. The user marking is preferably placed in a same location within a same page of the original document but, since some or all of the fields of any of the records in database 1304 can be edited or otherwise modified by a user thereof, the various fields may be manipulated such that the associated user marking or object is placed at a different location on a different page, or even a different document, other than the original document from which it was retrieved. Lastly, the example record 1302 has an "Additional Comments" field wherein a user hereof, using a graphical user interface, may provide additional identification information that they want further associated with this particular user marking. In various embodiments, the field accepts alphanumeric characters of text entered via a standard keyboard having a QWERTY configuration.

It should be fully appreciated that user marking identification record 1302 is but one example and is intended for explanatory purposes. Other entries and record data fields may be used in addition to or in substitution for any of the fields shown in the example record(s) of FIG. 13. Pointers may be implemented which link the n-records together in a linked list, for instance. Such a linked list may comprise a doubly-linked list wherein one record points to a next record and a previous record, if one exists, using 'next' and 'prev' pointer fields in each of the records. A 'next' pointer in a last record in the linked list of records would contain a NULL field since there is no "next" record to point to. For a similar reason, the 'prev' pointer in the first record of the linked list of records would also contain a NULL field. Various implementations and embodiments hereof are intended to fall within the scope of the appended claims.

Figure 14:
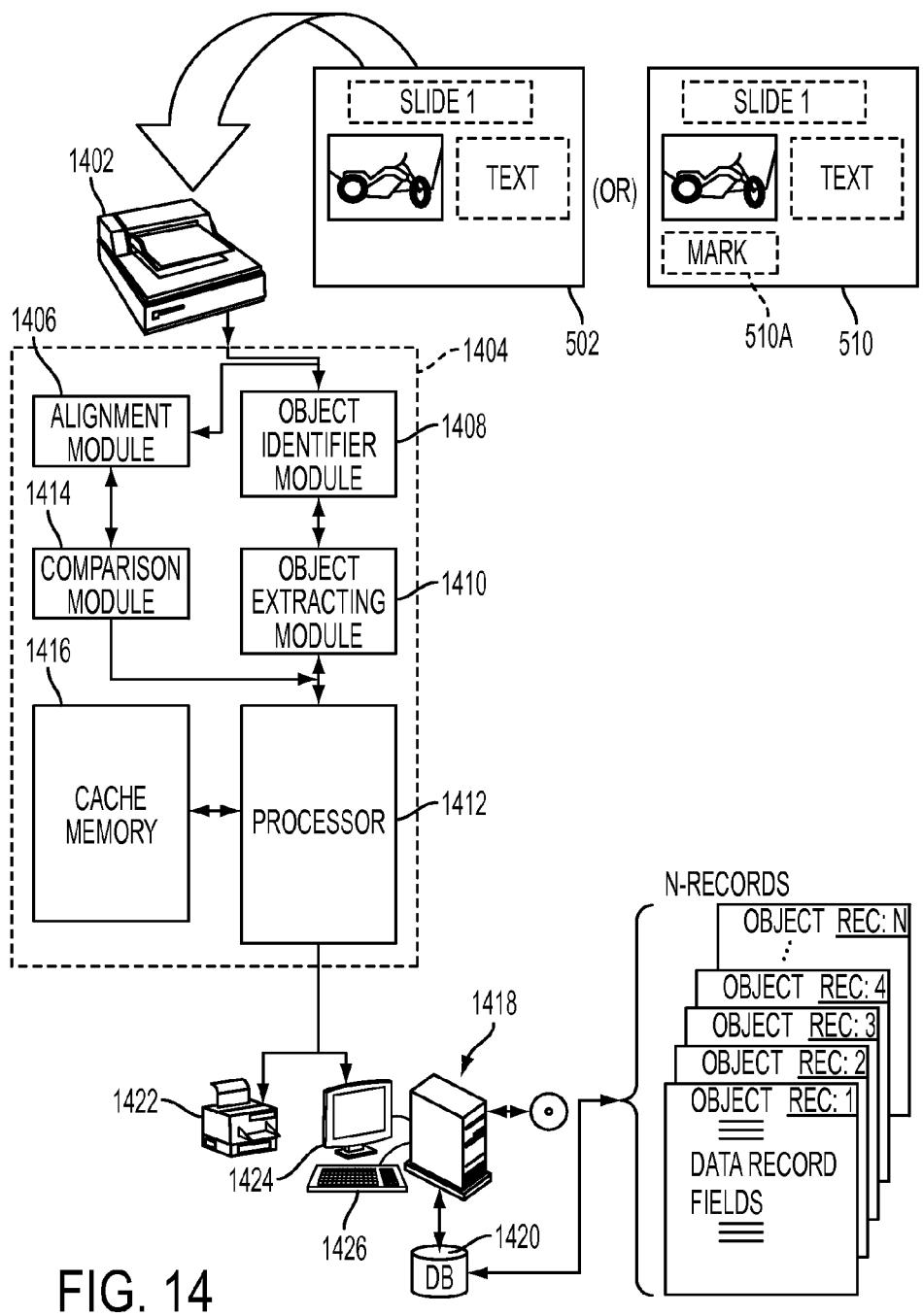
FIG. 14 illustrates one example system for performing various aspects of the present method for preserving user markings applied to a hardcopy print of an original document.

Reference is now being made to FIG. 14, which illustrates one example system for performing various aspects of the present method for preserving user markings which have been applied to a hardcopy print of an original document and for generating a new original document containing the user markings.

In FIG. 14, an example original document, such as original document 502, and an example marked document, such as marked document 510 containing user marking 510, are scanned using scanning device 1402 to obtain an image of each of the original document and marked document. The respective document images are provided to document analysis and processing module 1404. Such a module can be a computer workstation configured to perform various aspects of any of the above-described embodiments, or may be a dedicated system, such as an ASIC or software system similarly configured. The image of the original document and the image of the scanned at least one marked document are provided to alignment module 1406 wherein, in this particular embodiment, an image registration is performed on the received images such that a common orientation is achieved therebetween. In one embodiment, an output of the alignment module comprises a bitmap of a one document image is overlaid on a bitmap of the other document image such that a pixel by pixel comparison can be effectuated. In another embodiment discussed with respect to the flow diagram of FIG. 8 wherein objects are identified and extracted from each of the original document and marked documents and a comparison made therebetween to effectuate a determination of the user markings contained within the image of the marked document, the scanned document images are provided directly to object identifier module 1408 which identifies content objects contained within the document image. The identified objects are then provided to object extraction module 1410 wherein the identified embedded objects in any of the image of the original document or the image of the marked document are extracted. The output of the object extraction module comprises the extracted objects and any other object identification information which can be obtained from the document images from which that object was extracted. An output of alignment module 1406 is provided to comparison module 1414 wherein the overlaid images are compared, pixel-by-pixel, to obtain a bitmap of pixels which are found to reside in the image of the marked document but not within the image of the original document. The comparison module produces a bitmap of such difference pixels. Such a bitmap contains the user markings. One example bitmap is shown and discussed with respect to bitmap 1000 of FIG. 10. Processor 1412 helps facilitate the functions performed and provides cache memory and processing throughput to the between the various modules. In other embodiments, processor 1412 executes a plurality of machine readable program instructions stored in cache memory 1416 for performing various aspects of any of the functionality of any of the modules shown in system 1404 and discussed with respect to the flow diagrams hereof. Processor 1404 is in further communication with computer system 1418 wherein the extracted objects, as shown in FIG. 9, and/or the bitmap image containing the user markings are further processed in accordance herewith. In one embodiment, the received extracted objects and/or the received bitmap are stored to storage device 1420. In another, any of the extracted objects received from object extraction module 1410 and/or the received bitmap are provided to image output device 1422 or displayed on display device 1424. In various embodiments, the user enters identification information using keyboard 1426 for any of the extracted embedded objects and/or any of the bitmap image. Any identification information may be automatically generated without a user input. Such identification information for one example record is shown and discussed with respect to record 1302 of FIG. 13.

Example System for Generating New Composite Document

Figure 15:
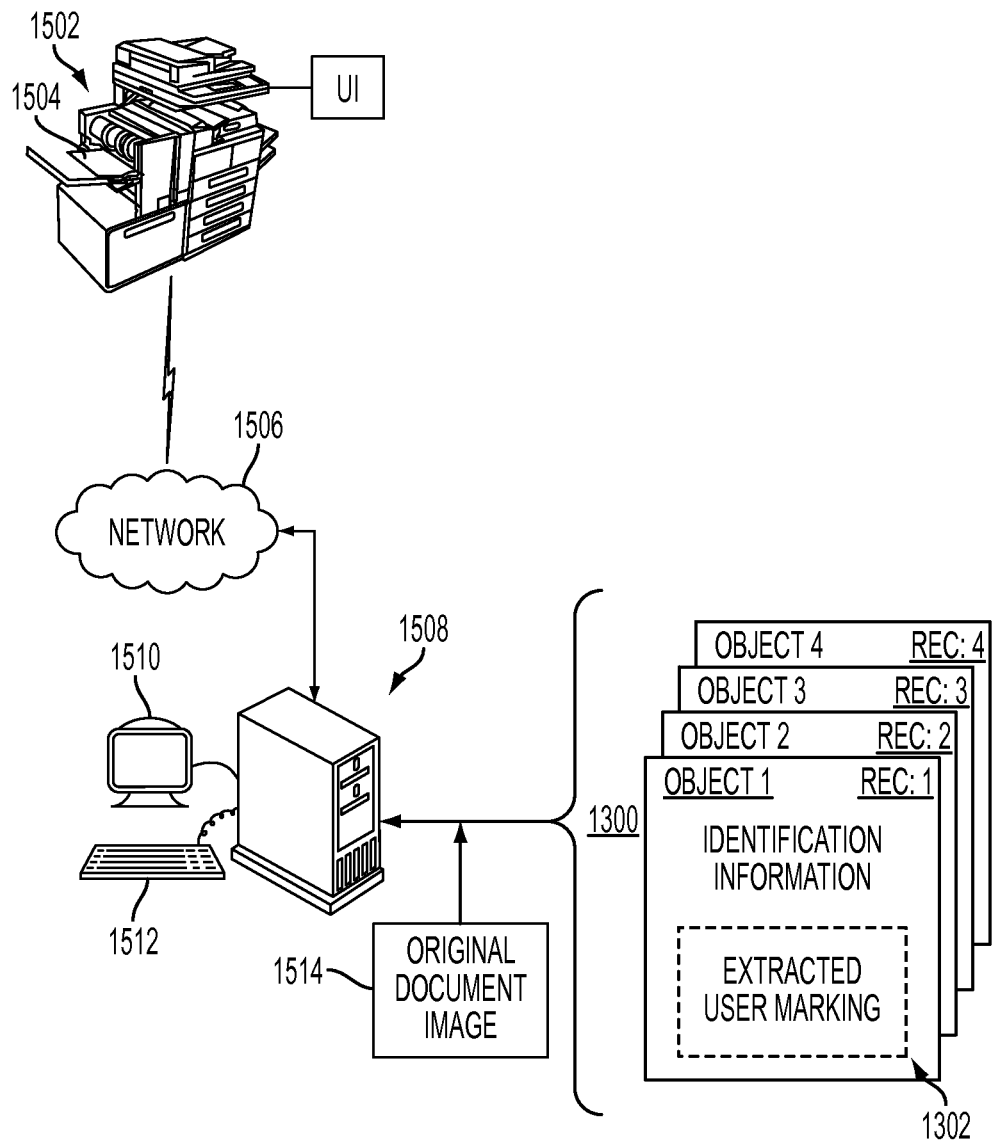
FIG. 15 illustrates an example system for retrieving at least some of the plurality of records of FIG. 13 and combining the user markings associated therewith the image of the original document to produce new composite document 1504.

Reference is now being made to FIG. 15 which illustrates an example workstation system for retrieving at least some of the plurality of records and combining the user markings obtained from the retrieved records with image of the original document to produce new composite document.

In FIG. 15, a plurality of records, shown collectively at 1300, have been created in accordance with the above-described embodiments and are further shown and discussed in detail with respect to FIG. 13. These records contain object identification information and, in this embodiment, an extracted user marking associated with the identification information. Although on a first record 1302 is shown, there are 4 records containing user markings and each of their respective object identification information. Such records are stored in a storage device (not shown) and are readily addressable by a central processing unit of workstation 1508 either directly or in response to a user query. An example workstation comprises a system which is further described with respect to the example special purpose computer of FIG. 18. An image of the original document also resides on the storage device and is retrieved by the workstation. An image of the marked document may further be stored therein along with any of the bitmaps, lists, objects, and other information which associates the user markings with their respective locations on a given page with the original document. Also stored in a storage device, internal to workstation 1508, are software tools for performing the comparisons of the image of the at least one marked documents with the image of the original document, in accordance herewith, to identify the user markings in the image of the marked document. Image manipulation software enables a user to view the bitmap image containing the user markings, such as the image of FIG. 10, on display device 1510 and crop the various user markings from the bitmap image and save the cropped markings, such as user markings 1202 and 1204 of FIG. 12, into records 1300 and provide user marking identification information via user interface 1512. Computer workstation retrieves original document image 1514 from the storage device and, in various embodiments, serially retrieves the stored records of user markings associated with this document image. In this example embodiment, the user marking contained in first record 1302 is retrieved along with any of the identification information for this first object, and displayed on graphical display device 1510 for review by a user. The user makes a decision whether this particular user marking is intended to be combined with the image of the original document to produce the new composite document. The user responds via keyboard 1512. If so, then this user marking is added to the corresponding page of the original document according to the location information retrieved from the first record associated with this first user marking object. Thereafter, a record of a next object (object 2) is retrieved from the plurality of records 1300. That user marking and the associated object identification information is next displayed for the user on display device 1510. Again, the user responds whether they desire this particular user marking to be combined into the image of the original document to produce the new composite document. The process repeats for each user marking object record associated with the image of the original document 1514. Thereafter, the new composite document containing the user markings having been added into the respective page locations in the image of the original document is communicated to image output device 1502 via network 1506 wherein the new document image 1504 is rendered. The new composite document may alternatively be stored to a storage device or communicated to a remote device over the network. In another embodiment, entire bitmap images, such as image 1000 of FIG. 10, are stored in an associated record and the entire bitmap is logically added into the associated page of the image of the original document. Such a logical addition of the bitmap of the user markings for a given page can be overlaid, on a pixel-by-pixel basis, for example, on to the corresponding page of the original document. In this embodiment, each successive retrieved bitmap of an entire page of user markings is added into the image of the original document at their respective page locations to produce the new composite document. Such alternative embodiments are intended to fall within the scope of the appended claims.

Any features or functions of any of the above-described systems, such as those systems discussed with respect to the embodiments of FIGS. 14 and 15, for example, may comprise, in whole or in part, a special purpose computer which includes a processor capable of executing machine readable program instructions for carrying out one or more aspects of the present method. Such a special purpose computer may comprise, for example, a micro-processor, micro-controller, device driver, an electronic circuit, or an ASIC designed to perform some or all of the methods hereof. Such a special purpose computer can be integrated, in whole or in part, with for example, a xerographic system, a color management system, an image processing system, or a digital front end (DFE). All or portions of the diagrams of the present system and method, as illustrated herein, may be implemented partially or fully in hardware in conjunction with machine executable instructions in communication with various components of such a system. The exact nature of the implementation will depend on the document processing environment wherein the present method finds its intended uses. One embodiment special purpose computer is shown and discussed with respect to FIG. 18.

Example Flow Diagram of Document Generation

Figure 16:
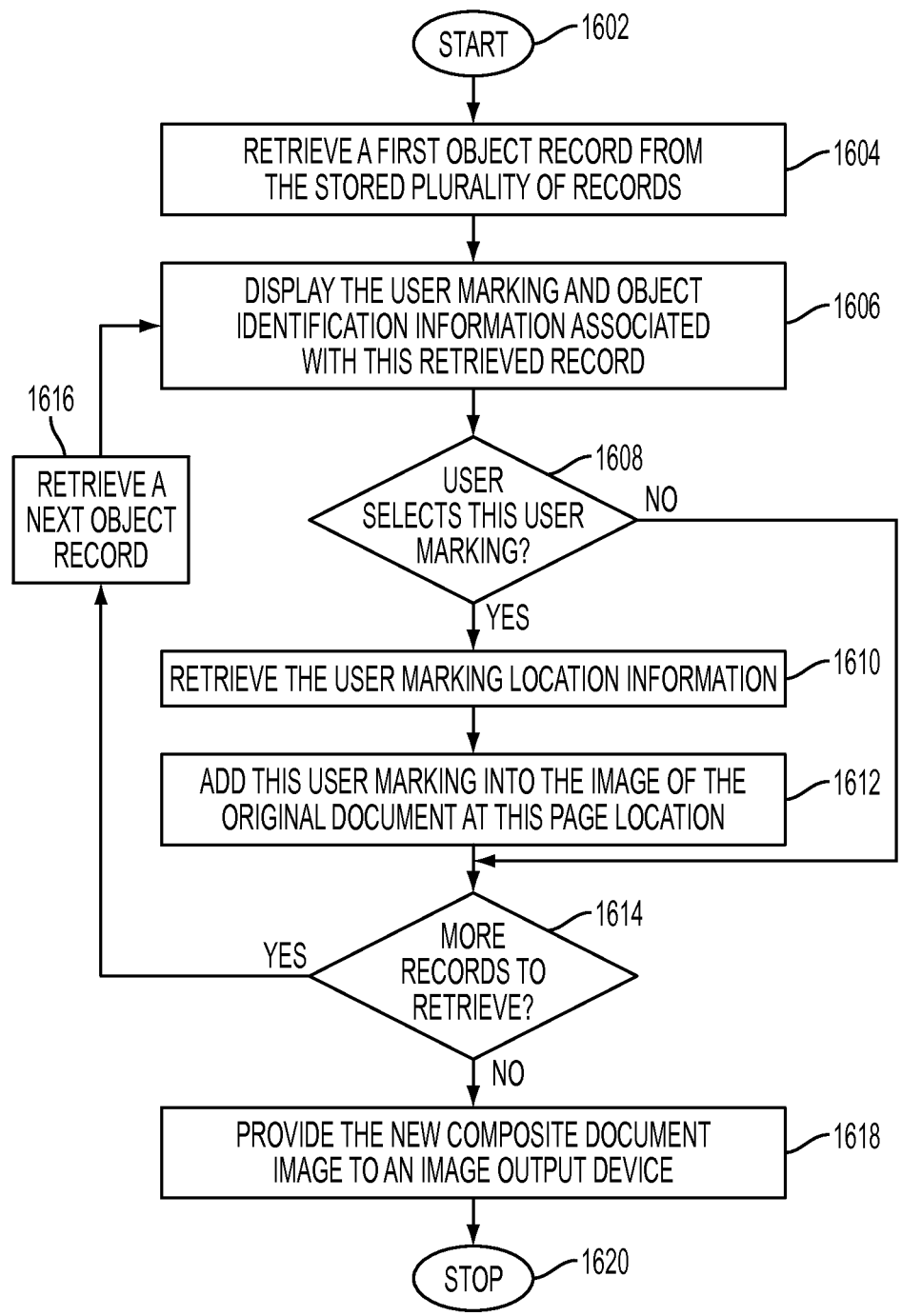
FIG. 16 is a flow diagram of one example embodiment of the present method for generating a new composite document in accordance with various embodiments hereof.

Reference is now being made to the flow diagram of FIG. 16 which illustrates one example embodiment of the present method for generating a new composite document in accordance with various embodiments hereof. Flow processing starts at 1602 and immediately proceeds to step 1604.

At step 1604, retrieve a first record from the stored plurality of records shown, for example, at 1302.

At step 1606, display the user marking and the object identification information associated with the first record object retrieved in step 1604 for a user review. Such a record would be displayed using the graphical display 1510 of the example computer workstation 1508.

At step 1608, a determination is made whether a user desires the displayed user marking to be included in the new composite document. If the user desires this user marking to be included in the new composite document then, at step 1610, the location information associated with this particular user marking is retrieved from the associated record. Such location information enables this user marking to be placed onto its respective page location in the image of the original document 1514. If the user does not desire this user marking, for whatever the reason, to be included in the new composite document intended to be generated, then processing proceeds with respect to step 1614 discuss herein further.

At step 1612, add this user marking into the image of the original document at the retrieved respective page location. The page location includes, for example, the xx/yy starting locations in the corresponding page of the original document as shown associated with user marking 1204. In the embodiment wherein an entire bitmap stored in a given record or otherwise associated therewith comprises an entire bitmap page of user markings, as shown in FIG. 12, then this entire bitmap page would be overlaid, pixel-by-pixel, with the corresponding page in the original document to produce a respective page of the new composite document. In those computing environments where storage space is not limited or is otherwise not a concern, entire pages of bitmaps of user markings may be stored in a given record. However, if storage space is a constraint, only the extracted user markings (1202 and 1204, for example) are stored in a given record.

At step 1614, a determination is made whether there are any more records of user marking objects which need to be considered. If so then processing proceeds with respect to step 1616 wherein a record of a next object is retrieved and processing proceeds thereafter with respect to step 1606. Otherwise, if there are now more records to be processed in accordance herewith, then all desired user markings have been added into the image of the original document at their respective page locations and the new composite document is complete.

At step 1618, provide the new composite document image to an image output device, such as document reproduction device 1502 of FIG. 15, wherein the new composite document containing the user markings extracted from each of the at least one marked documents is reduced to a hardcopy print 1504 of FIG. 15. Thereafter, processing stops at 1620.

It should be understood that the hardcopy print of the new composite document, which now contains selected user markings from one or more consumers of the original document may, in turn, be circulated again for a second round of commenting wherein additional user markings may further be added. In this instance, the new composite document becomes the original document, user markings applied to the circulated new composite document produce the various marked documents, and the above-described processes are repeated again for the "new" original document. Such additional user markings may be combined with any of the user markings extracted from the previous circulated version of the document and stored in a similar manner. Such additional markings may be crossed-out by a subsequent user such as, for instance, a senior manager who desires that a user marking not be included in a subsequent revision of the document. User markings which are not intended to be included in a subsequent revision of the circulated document may have their associated object records deleted from the database of records or otherwise flagged therein that this user marking is no longer desirable and should not be included when a next new composite document is generated. The above-described process may be repeated multiple times. Various alternatives and embodiments hereof are intended to fall within the scope of the appended claims.

Flow Diagram of Alternative Embodiment

Figure 17:
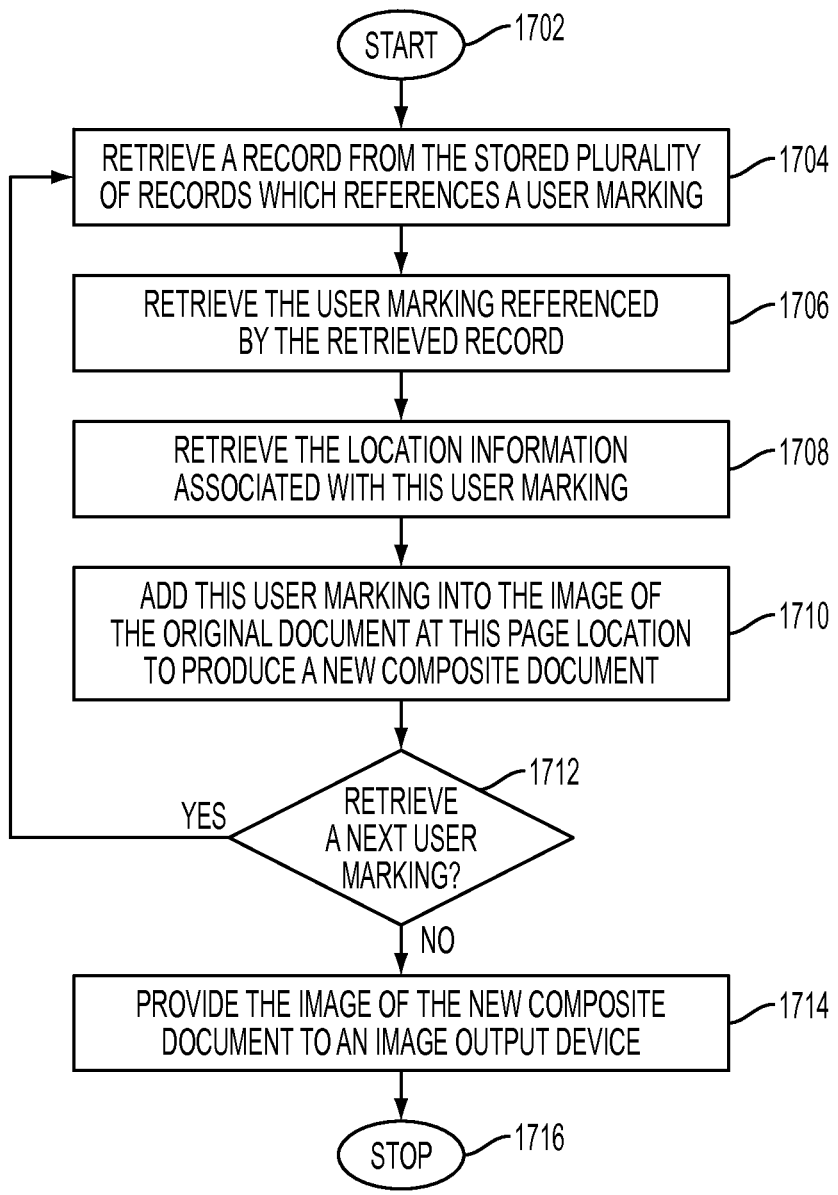
FIG. 17 is a flow diagram of another embodiment of the present method for generating a new composite document wherein the user markings are added back into the image of the original document automatically without a user intervention.

Reference is now being made to the flow diagram of FIG. 17 which illustrates another embodiment of the present method for generating a new composite document wherein the user markings are added back into the image of the original document automatically without a user intervention. Flow processing starts at 1702 and immediately proceeds to step 1704.

At step 1704, retrieve a record of a user marking from the plurality of stored records of user markings. The record may physically contain the extracted user marking or may reference the user marking or otherwise point to its location in a storage device or over a network. At step 1706, retrieve the user marking referenced by the record retrieved in step 1704. At step 1708, retrieve the location information associated with the user marking retrieved in step 1706. The location information for the associated user marking provides page location information in the image of the original document wherein this marking is to be added. At step 1710, add this user marking into the image of the original document using the retrieved page location information. Adding one or more user markings to the image of the original document creates a new composite document. At step 1712, a determination is made whether to retrieve a next user marking. If so, then processing proceeds back to step 1704 wherein a next user marking is retrieved. Processing repeats in an iterative manner until all user markings have been automatically retrieved without requiring a user intervention. At step 1714, after all the user markings have been retrieved and added into the image of the original document and the new composite document containing all the added user markings is now complete, the image of the new composite document is provided to an image output device wherein the new composite document is rendered. Thereafter, processing stops at 1716.

Example Special Purpose Computer

Reference is now being made to FIG. 18 which illustrates a block diagram of one example embodiment of a special purpose computer system for implementing one or more aspects of the present method as described with respect to the flow diagrams hereof and the system of FIG. 13. Such a special purpose processor 1800 is capable of executing machine executable program instructions.

In FIG. 18, communications bus 1802 serves as an information highway interconnecting the other illustrated components of special purpose computer system 1800. The special purpose computer incorporates a central processing unit (CPU) 1804 capable of executing machine readable program instructions for performing any of the calculations, comparisons, logical operations, object identifications and extractions, user marking identifications and extractions, and other program instructions for performing the methods described above with respect to the flow diagrams and illustrated embodiments hereof. The CPU is in communication with Read Only Memory (ROM) 1806 and Random Access Memory (RAM) 1808 which, collectively, constitute example memory storage devices. Such memory may be used to store machine readable program instructions and other program data and results to sufficient to carry out any of the functionality described herein.

Disk controller 1810 interfaces with one or more storage devices 1814. These storage devices may comprise external memory, zip drives, flash memory, USB drives, memory sticks, or other storage devices with removable media such as CD-ROM drive 1812 and floppy drive 1816. Machine executable program instructions for executing the methods hereof or for performing any of the functionality show with respect to the system embodiments of FIG. 14, for example. Any of the document images and bitmaps may also be stored on any of these storage devices. Such storage devices may be used to implement a database wherein various records of objects and user markings, such as those illustrated in FIG. 13, are stored for subsequent retrieval. Example computer readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. The computer readable medium may additionally comprise computer readable information in a transitory state medium such as a network link and/or a network interface, including a wired network or a wireless network, which allows the computer system to read such computer readable information. Computer programs (also called computer control logic) may be stored in a main memory and/or a secondary memory. Computer programs may also be received via the communications interface. The computer readable medium is further capable of storing data, machine instructions, message packets, or other machine readable information, and may include non-volatile memory. Such computer programs, when executed, enable the computer system to perform one or more aspects of the methods provided herein.

Display interface 1818 effectuates the display of information on display device 1820 in various formats such as, for instance, audio, graphic, text, and the like. Interface 1824 effectuates a communication via keyboard 1826 and mouse 1828. Such a graphical user interface is useful for a user to review any of the identified objects and/or user markings and for entering object identification information about any of the displayed information in accordance with various embodiments hereof.

Communication with external devices may occur using example communication port(s) 1822. Such ports may be placed in communication with any of the example networks shown and described herein, such as the Internet or an intranet, either by direct (wired) link or wireless link. Example communication ports include modems, network cards such as an Ethernet card, routers, a PCMCIA slot and card, USB ports, and the like, capable of transferring data from one device to another. Software and data transferred via any of the communication ports 1822 are in the form of signals which may be any of digital, analog, electromagnetic, optical, infrared, or other signals capable of being transmitted and/or received by the communications interface. Such signals may be implemented using, for example, a wire, cable, fiber optic, phone line, cellular link, RF, or other signal transmission means presently known in the arts or which have been subsequently developed.

Various Embodiments

One or more aspects of the methods described herein are intended to be incorporated in an article of manufacture, including one or more computer program products, having computer usable or machine readable media. The article of manufacture may be included on at least one storage device readable by machine architectures or other xerographic or image processing systems embodying executable program instructions capable of performing one or more aspects of the present method, as described herein. The article of manufacture may be included as part of a xerographic system, an operating system, a plug-in, or may be shipped, sold, leased, or otherwise provided separately either alone or as part of an add-on, update, upgrade, or product suite.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings hereof can be implemented in hardware or software using any known or later developed systems, structures, devices, and/or software by those skilled in the applicable art without undue experimentation from the functional description provided herein with a general knowledge of the relevant arts.

Moreover, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system. Furthermore, the teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

It will be appreciated that various of the above-disclosed and other features and functions, or alternatives thereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting.

Various changes to the above-described embodiments may be made without departing from the spirit and scope of the invention. The teachings of any printed publications including patents and patent applications, are each separately hereby incorporated by reference in their entirety.

What is claimed is:

1. A computer implemented method for preserving markings made to a hardcopy of an original document, the method comprising:
   receiving an image of an original document;
   extracting one or more embedded objects within said original document to create a first list of objects embedded in said original document, said embedded objects being separable content that includes at least one of text, graphics, pictures, plots, user markings, and line art;
   receiving, using an image input device, an image of a marked document containing at least one user marking;
   extracting one or more embedded objects in said marked document to create a second list of objects embedded in said marked document, said embedded objects being separable content that includes at least one of text, graphics, pictures, plots, user markings, and line art;
   comparing said first list to said second list in order to identify said extracted user marking;
   generating an object identification record comprising a plurality of data fields containing information about said extracted user marking and information which enables said extracted user marking to be associated with a particular location within a given page of said original document;

associating said object identification record with said extracted user marking;

storing said extracted at least one user marking to a storage device; and storing said generated object identification record to a database.

2. The method of claim 1, wherein said plurality of data fields in said object identification record further comprise at least one of a date when said user marking was applied to a hardcopy of said original document, a date when said user marking was extracted, a date when said original document was created, and a timestamp.

3. The method of claim 1, wherein said plurality of data fields in said object identification record further comprise at least one of a name of a user who associated with said user marking.

4. The method of claim 1, wherein said plurality of data fields in said object identification record further comprise at least one of a title of said original document, a page number of said original document wherein said user marking was applied.

5. The method of claim 1, wherein said plurality of data fields in said object identification record further comprise at least one of a location in said computer file system where said extracted user marking can be retrieved, and additional comments entered by a user.

6. The method of claim 5, further comprising:
performing any of:
storing said new composite document to a storage device;
communicating said new composite document to a computer system over a network; and
printing said new composite document using an image output device.

7. The method of claim 1, wherein associating said object identification record with said extracted user marking comprises any of: placing said extracted user marking in said object identification record, and saving a location in said object identification record where said extracted user marking is stored in said storage device such that said user marking can be subsequently retrieved.

8. The method of claim 1, wherein, in response to a user desiring to create a new composite document, further comprising:
retrieving at least one of said stored extracted user markings;
displaying, on a graphical display of a computer workstation, said extracted user marking for review by a user; and
determining whether said user desires to include said displayed user marking in said new composite document.

9. The method of claim 8, wherein, in response to said user desiring said user marking to be included in said new composite document, further comprising:
retrieving said object identification record associated with said displayed user marking;
extracting location information from said retrieved object identification record; and
placing said user marking onto its respective page location in said image of said original document to produce a respective page of a new composite document.

10. The method claim 1, wherein said extracted user marking comprises a text object, and information about said extracted user marking comprises text generated by an optical character recognition (OCR) software having processed said text object.

11. The method of claim 1, wherein said plurality of data fields in said object identification record further comprise at least one of a location in said computer file system where said extracted user marking can be retrieved, and additional comments entered by a user.

12. The method of claim 1, wherein said embedded objects being separable content contained within said original document include text, graphics, pictures, plots, user markings, and line art.

13. The method of claim 1, wherein said comparing said first list to said second list in order to identify said extracted user marking further includes designating an embedded object listed in said second list and not listed in said first list as said extracted user marking.

14. The method of claim 13, wherein said comparing said first list to said second list in order to identify said extracted user marking further includes designating an embedded object listed in said second list and listed in said first list as not said extracted user marking.

15. A system for preserving markings made to a hardcopy of an original document, said system comprising:
a memory;
an image input device;
a storage medium for storing data; and
a processor in communication with said storage medium, said image input device, and said memory, said processor executing machine readable instructions for performing the method of:
receiving an image of an original document;
extracting one or more embedded objects within said original document to create a first list of objects embedded in said original document, said embedded objects being separable content that includes at least one of text, graphics, pictures, plots, user markings, and line art;
receiving, using an image input device, an image of a marked document containing at least one user marking;
extracting one or more embedded objects in said marked document to create a second list of objects embedded in said marked document, said embedded objects being separable content that includes at least one of text, graphics, pictures, plots, user markings, and line art;
comparing said first list to said second list in order to identify said extracted user marking;
generating an object identification record comprising a plurality of data fields containing information about said extracted user marking and information which enables said extracted user marking to be associated with a particular location within a given page of said original document;
associating said object identification record with said extracted user marking;
storing said extracted at least one user marking to a storage device; and
storing said generated object identification record to a database.

16. The system of claim 15, wherein said plurality of data fields in said object identification record comprise any of: a date when said user marking was applied to a hardcopy of said original document, a date when said user marking was extracted, a date when said original document was created, and a timestamp.

17. The system of claim 16, further comprising:
performing any of:
- storing said new composite document to a storage device;
- communicating said new composite document to a computer system over a network; and
- printing said new composite document using an image output device.

18. The system of claim 15, wherein said plurality of data fields in said object identification record further comprise at least one of a name of a user who associated with said user marking.

19. The system of claim 15, wherein said plurality of data fields in said object identification record further comprise at least one of a title of said original document, a page number of said original document wherein said user marking was applied.

20. The system of claim 15, wherein said plurality of data fields in said object identification record further comprise at least one of a location in said computer file system where said extracted user marking can be retrieved, and additional comments entered by a user.

21. The system of claim 15, wherein associating said object identification record with said extracted user marking comprises any of: placing said extracted user marking in said object identification record, and saving a location in said object identification record where said extracted user marking is stored in said storage device such that said user marking can be subsequently retrieved.

22. The system of claim 15, wherein, in response to a user desiring to create a new composite document, further comprising:
- retrieving at least one of said stored extracted user markings;
- displaying, on a graphical display of a computer workstation, said extracted user marking for review by a user; and
- determining whether said user desires to include said displayed user marking in said new composite document.

23. The system of claim 22, wherein, in response to said user desiring said user marking to be included in said new composite document, further comprising:
- retrieving said object identification record associated with said displayed user marking;
- extracting location information from said retrieved object identification record; and
- placing said user marking onto its respective page location in said image of said original document to produce a respective page of a new composite document.

24. The system of claim 15, wherein said embedded objects being separable content contained within said original document include text, graphics, pictures, plots, user markings, and line art.

25. The system of claim 15, wherein said comparing said first list to said second list in order to identify said extracted user marking further includes designating an embedded object listed in said second list and not listed in said first list as said extracted user marking.

26. The system of claim 25, wherein said comparing said first list to said second list in order to identify said extracted user marking further includes designating an embedded object listed in said second list and listed in said first list as not said extracted user marking.

* * * * *